(12) United States Patent
Bridges

(10) Patent No.: US 10,697,754 B2
(45) Date of Patent: Jun. 30, 2020

(54) THREE-DIMENSIONAL COORDINATES OF TWO-DIMENSIONAL EDGE LINES OBTAINED WITH A TRACKER CAMERA

(71) Applicant: FARO Technologies, Inc., Lake Mary, FL (US)

(72) Inventor: Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 127 days.

(21) Appl. No.: 16/123,038

(22) Filed: Sep. 6, 2018

(65) Prior Publication Data
US 2019/0178627 A1   Jun. 13, 2019

Related U.S. Application Data

(60) Provisional application No. 62/595,745, filed on Dec. 7, 2017.

(51) Int. Cl.
| | |
|---|---|
| G01B 11/00 | (2006.01) |
| G06T 7/13 | (2017.01) |
| G01S 17/66 | (2006.01) |
| G01S 17/89 | (2020.01) |
| G06T 7/73 | (2017.01) |
| G02B 5/122 | (2006.01) |
| G06T 7/55 | (2017.01) |
| G01S 17/46 | (2006.01) |
| G01S 17/86 | (2020.01) |

(Continued)

(52) U.S. Cl.
CPC .......... *G01B 11/002* (2013.01); *G01S 17/46* (2013.01); *G01S 17/66* (2013.01); *G01S 17/86* (2020.01); *G01S 17/89* (2013.01); *G02B 5/122* (2013.01); *G06T 7/13* (2017.01); *G06T 7/73* (2017.01); *G06T 7/97* (2017.01); *G06T 11/001* (2013.01); *G06T 7/55* (2017.01)

(58) Field of Classification Search
CPC ....... G01B 11/002; G01S 17/86; G01S 17/66; G01S 17/89; G01S 17/46; G06T 7/73
USPC ........................................................ 382/154
See application file for complete search history.

(56) References Cited

U.S. PATENT DOCUMENTS

| | | | |
|---|---|---|---|
| 2015/0308818 A1* | 10/2015 | Bridges | G01S 17/66 356/3.02 |
| 2016/0098858 A1* | 4/2016 | Patkar | G06T 7/73 345/420 |

(Continued)

FOREIGN PATENT DOCUMENTS

WO   2016053067 A1   4/2016

OTHER PUBLICATIONS

Extended European Search Report for Application No. 18210623.7 dated Apr. 11, 2019; 11 pgs.

(Continued)

*Primary Examiner* — Shahriar Behnamian
(74) *Attorney, Agent, or Firm* — Cantor Colburn LLP

(57) ABSTRACT

At each of three different locations, a tracker captures a 2D image an object and measures three points in space at each of three tracker locations relative to the object. Based on this information, the tracker determines, in an object frame of reference, three-dimensional coordinates of an arbitrary point on an edge line common to the three 2D images.

15 Claims, 18 Drawing Sheets

(51) Int. Cl.
    *G06T 7/00*    (2017.01)
    *G06T 11/00*   (2006.01)

(56) References Cited

U.S. PATENT DOCUMENTS

2017/0094251 A1* 3/2017 Wolke ................ H04N 13/246
2017/0191822 A1* 7/2017 Becker ................ G01S 7/4808

OTHER PUBLICATIONS

Dall' Asta, E., et al., "A Comparison of Semiglobal and Local Dense Matching Algorithms for Surface Reconstruction" The International Archives of the Photogrammetry, Remote Sensing and Spatial Information Sciences, vol. XL-5, 2014 ISPRS Technical Commission V Symposium, Jun. 23-25, 2014, Riva del Garda, Italy (pp. 187-194).

Remondino, F., et al., "Dense image matching: comparisons and analyses" Dept. Mechanics Politecnico of Milano, 3D Optical Metrology (3DOM) unit, Bruno Kessler Foundation, 2013 IEEE (pp. 47-54).

Trujillo-Pino, A., et al., "Accurate subpixel edge location based on partial area effect" 2012 Elsevier, Image and Vision Computing 31 (2013) (pp. 72-90).

* cited by examiner

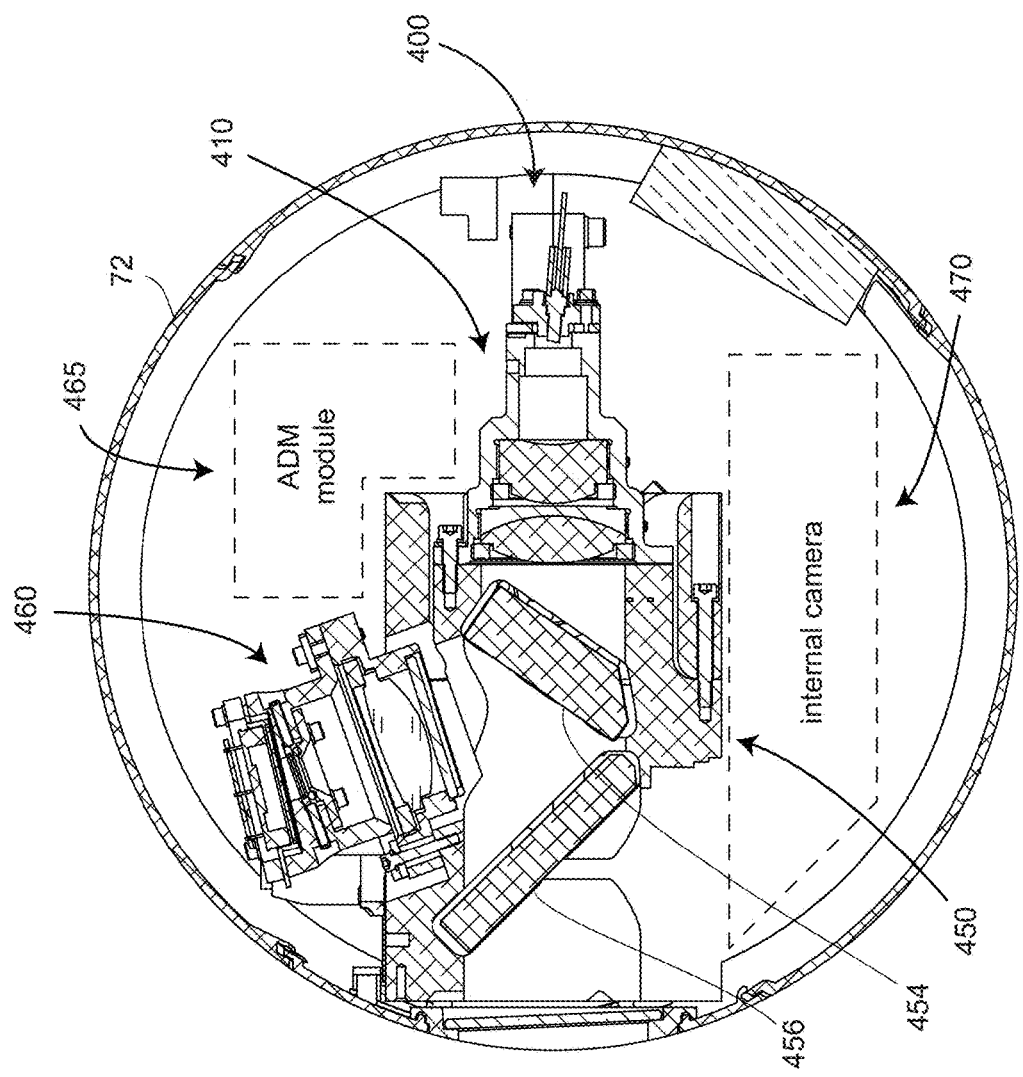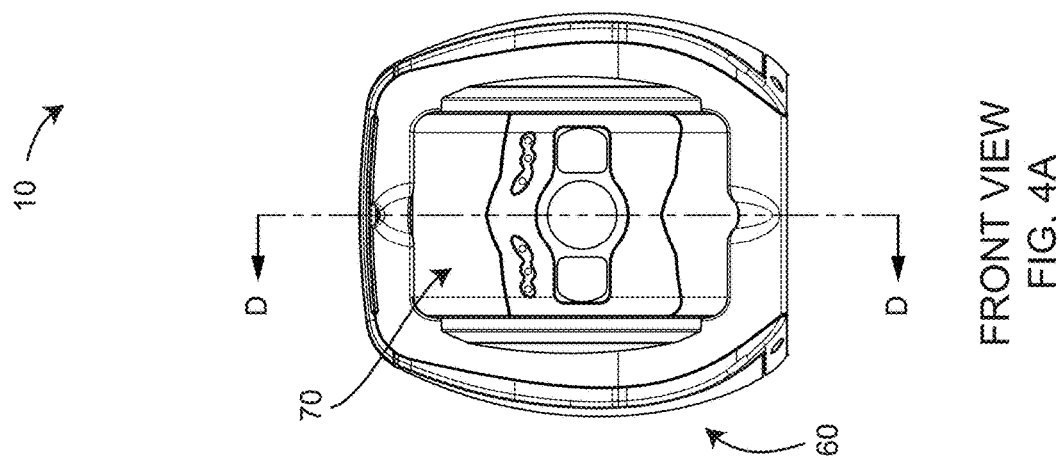

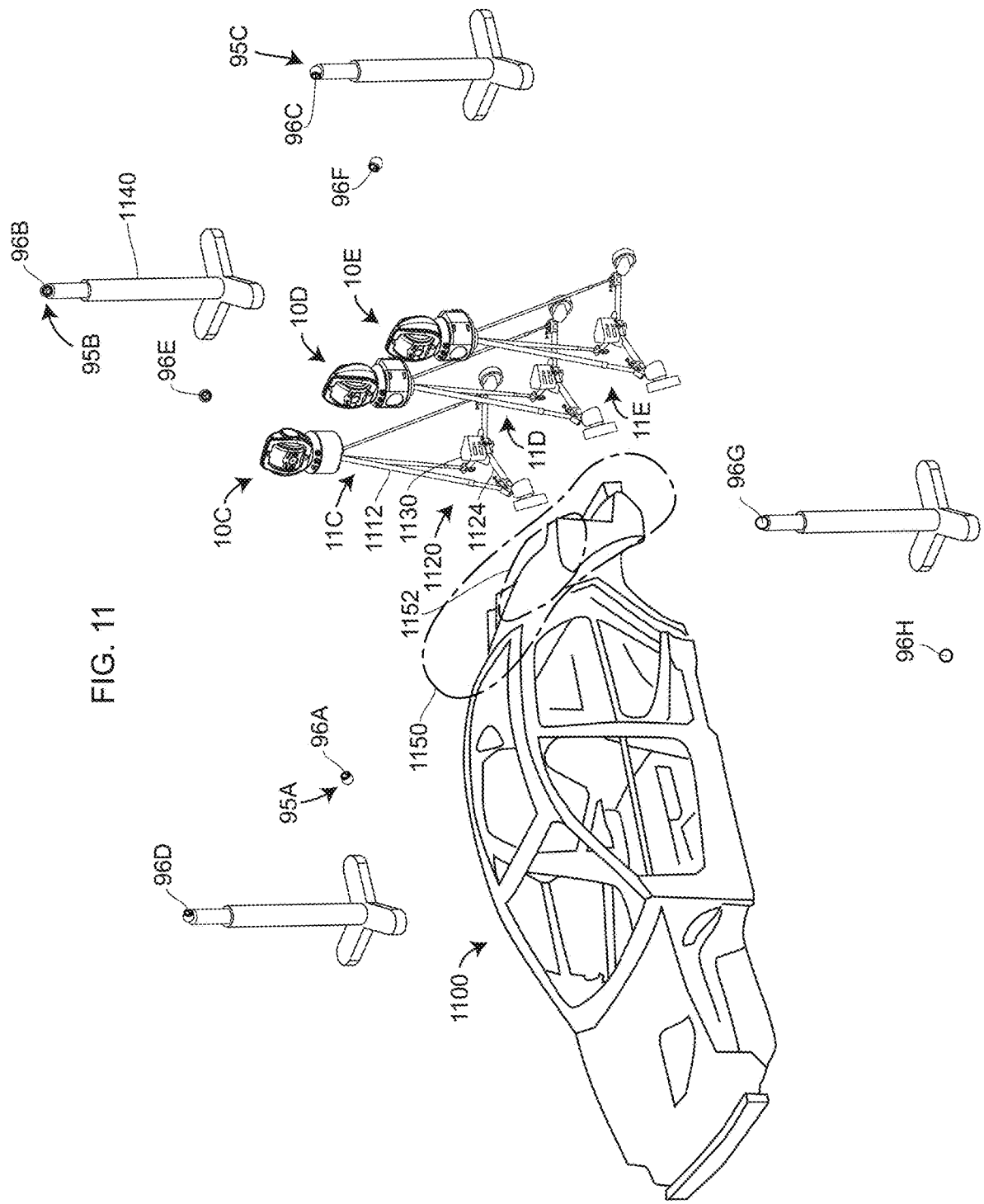

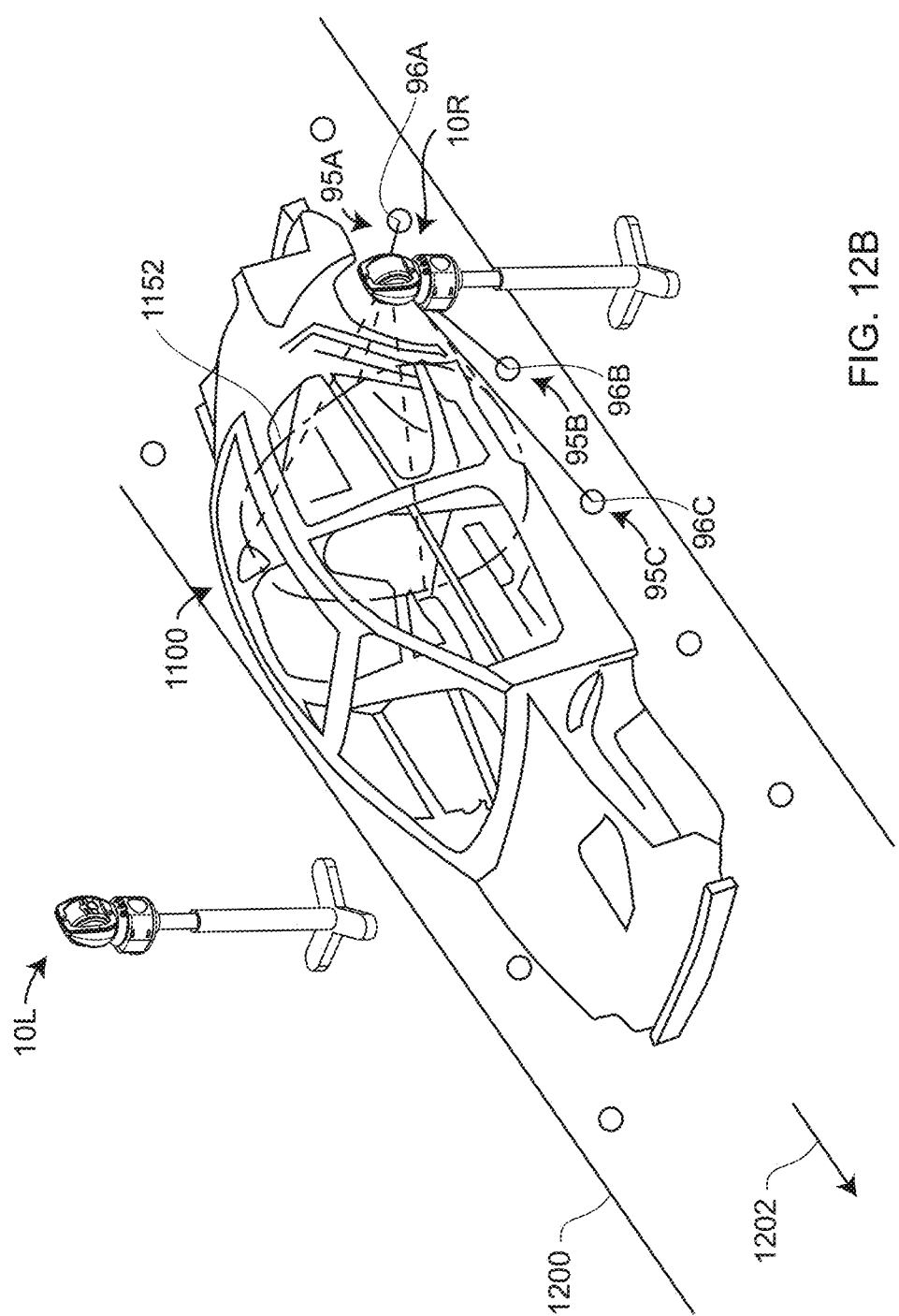

THREE-DIMENSIONAL COORDINATES OF TWO-DIMENSIONAL EDGE LINES OBTAINED WITH A TRACKER CAMERA

CROSS-REFERENCE TO RELATED APPLICATIONS

The present application is a nonprovisional application claiming the benefit of U.S. Provisional Application Ser. No. 62/595,745 filed on Dec. 7, 2017, the contents of which are incorporated by reference in their entirety.

BACKGROUND

The present disclosure relates to a coordinate measuring device. One set of coordinate measurement devices belongs to a class of instruments that measure the three-dimensional (3D) coordinates of a target point by sending a beam of light to the point. The beam of light may impinge directly on the point or on a retroreflector target in contact with the point. In either case, the instrument determines the coordinates of the target point by measuring a distance and two angles to the target. The distance is measured with a distance-measuring device such as an absolute distance meter or an interferometer. The angles are measured with an angle-measuring device such as an angular encoder. The beam may be steered with a gimbaled mechanism, a galvanometer mechanism, or other mechanism.

A tracker is a particular type of coordinate-measuring device that tracks the retroreflector target with one or more beams it emits, which may include light from a laser or non-laser light source. Coordinate-measuring devices closely related to the tracker the total station. A total station is a 3D measuring device most often used in surveying applications. It may be used to measure the coordinates of a diffusely scattering target or a retroreflective target. Hereinafter, the term tracker is used in a broad sense to include trackers as well as total stations and to include dimensional measuring devices that emit laser or non-laser light.

In many cases, a tracker sends a beam of light to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface of the SMR rests remains constant, even as the SMR is rotated. Consequently, the tracker can measure the 3D coordinates of a surface by following the position of an SMR as it is moved over the surface. Stating this another way, the tracker measures only three degrees of freedom (one radial distance and two angles) to fully characterize the 3D coordinates of a surface.

One type of tracker contains only an interferometer (IFM) without an absolute distance meter (ADM). If an object blocks the path of the beam of light from one of these trackers, the IFM loses its distance reference. The operator must then track the retroreflector to a known location to reset to a reference distance before continuing the measurement. A way around this limitation is to put an ADM in the tracker. The ADM can measure distance in a point-and-shoot manner. Some trackers contain only an ADM without an interferometer.

A gimbal mechanism within the tracker may be used to direct a beam of light from the tracker to the SMR. Part of the light retroreflected by the SMR enters the tracker and passes onto a position detector. A control system within the tracker uses position of the light on the position detector to adjust the rotation angles of the mechanical axes of the tracker to keep the beam of light centered on the SMR. In this way, the tracker is able to follow (track) a moving SMR.

Angle measuring devices such as angular encoders are attached to the mechanical axes of the tracker. The one distance measurement and two angle measurements of the tracker are sufficient to specify a three-dimensional location of the SMR. In addition, several trackers are available or have been proposed for measuring six degrees-of-freedom (six-DOF), rather than the ordinary three degrees-of-freedom.

Many trackers today include one or more cameras. Such cameras may be attached to outer portions of the rotatable tracker frame or may be positioned internal to the tracker. The main uses for such cameras are in determining the location of retroreflectors or in performing six-DOF measurements. In the past, tracker cameras have provided images sometimes used to augment measured 3D. One way of doing this has been to identify interest points seen in common in each of multiple 2D images and then to tie these 2D images to 3D coordinates measured by the tracker. However, such methods have been limited in their ability to determine 3D coordinates of continuous lines, for example, as are commonly seen on the edges of objects.

Although trackers are generally suitable for their intended purpose, the need for improvement remains, particularly in obtaining absolute 3D coordinates of continuous edges of objects based on 2D data obtained by tracker cameras.

SUMMARY

According to an embodiment of the present invention, a method comprises: fixing in an object frame of reference a first point, a second point, a third point, and an object; with a tracker in a first frame of reference relative to the object: measuring with the tracker three-dimensional (3D) coordinates of the first point, the second point, and the third point; and capturing with a camera coupled to the tracker a first image of a first region of the object; with the tracker in a second frame of reference relative to the object: measuring with the tracker 3D coordinates of the first point, the second point, and the third point; and capturing with the camera a second image of the first region of the object; with the tracker in a third frame of reference relative to the object: measuring with the tracker 3D coordinates of the first point, the second point, and the third point; and capturing with the camera a third image of the first region of the object; identifying a first edge line common to each of the first image, the second image, and the third image; selecting in one of the first image, the second image, and the third image an arbitrary fourth point on the first edge line; determining in the object frame of reference 3D coordinates of the fourth point based at least in part on the first image, the second image, the third image, the measured 3D coordinates of the first point, the second point, and the third point in the first frame of reference, the measured 3D coordinates of the first point, the second point, and the third point in the second frame of reference, and the measured 3D coordinates of the first point, the second point, and the third point in the third frame of reference; and storing the 3D coordinates of the fourth point.

In addition to one or more of the features described herein, or as an alternative, further embodiments of the method may include the first point, the second point, and the third point are points of a first retroreflector, a second retroreflector, and a third retroreflector, respectively.

In addition to one or more of the features described herein, or as an alternative, further embodiments of the method may include the object is fixed in space while the tracker moves relative to the object from the first frame of reference to the second frame of reference and from the second frame of reference to the third frame of reference.

In addition to one or more of the features described herein, or as an alternative, further embodiments of the method may include the tracker is fixed in space and the object moves relative to the tracker.

In addition to one or more of the features described herein, or as an alternative, further embodiments of the method may include determining in the object frame of reference a multiplicity of 3D coordinates of points on the first edge line based at least in part on the first image, the second image, the third image, the measured 3D coordinates of the first point, the second point, and the third point in the first frame of reference, the measured 3D coordinates of the first point, the second point, and the third point in the second frame of reference, and the measured 3D coordinates of the first point, the second point, and the third point in the third frame of reference.

In addition to one or more of the features described herein, or as an alternative, further embodiments of the method may include reconstructing 3D surface coordinates of the object based on the determined multiplicity of 3D coordinates of points on the first edge line and on a multiplicity of camera image points collected off the first edge line.

In addition to one or more of the features described herein, or as an alternative, further embodiments of the method may include adding color to the reconstructed 3D surface coordinates.

In addition to one or more of the features described herein, or as an alternative, further embodiments of the method may include attaching graphical elements to a visual representation of the object, the visual representation including the determined multiplicity of 3D coordinates of points on the first edge line.

According to another embodiment of the present invention, a system comprises: a tracker operable to measure three-dimensional (3D) coordinates of a retroreflector and to capture two-dimensional (2D) camera images with a camera coupled to the tracker; an object, a first retroreflector having a first point, a second retroreflector having a second point, and a third retroreflector having a third point, each of the object, the first point, the second point, and the third point being in an object frame of reference; and a processor operable to execute nontransitory computer instructions that, when executed on the processor: causes the tracker, in a first frame of reference relative to the object, to measure 3D coordinates of the first point, the second point, and the third point; causes the camera, in the first frame of reference, to capture a first image of a first region of the object; causes the tracker, in a second frame of reference relative to the object, to measure 3D coordinates of the first point, the second point, and the third point; causes the camera, in the second frame of reference, to capture a second image of the first region of the object; causes the tracker, in a third frame of reference relative to the object, to measure 3D coordinates of the first point, the second point, and the third point; causes the camera, in the third frame of reference, to capture a third image of the first region of the object; identifies a first edge line common to each of the first image, the second image, and the third image; selects in one of the first image, the second image, and third image an arbitrary fourth point on the first edge line; and determines in the object frame of reference 3D coordinates of the fourth point based at least in part on the first image, the second image, the third image, the measured 3D coordinates of the first point, the second point, and the third point in the first frame of reference, the measured 3D coordinates of the first point, the second point, and the third point in the second frame of reference, and the measured 3D coordinates of the first point, the second point, and the third point in the third frame of reference.

In addition to one or more of the features described herein, or as an alternative, further embodiments of the system may include the object is fixed in space while the tracker moves relative to the object.

In addition to one or more of the features described herein, or as an alternative, further embodiments of the system may include the tracker is fixed in space and the object moves relative to the tracker.

In addition to one or more of the features described herein, or as an alternative, further embodiments of the system may include the processor is further operable to execute nontransitory computer instructions that, when executed on the processor, determines in the object frame of reference a multiplicity of 3D coordinates of points on the first edge line based at least in part on the first image, the second image, the third image, the measured 3D coordinates of the first point, the second point, and the third point in the first frame of reference, the measured 3D coordinates of the first point, the second point, and the third point in the second frame of reference, and the measured 3D coordinates of the first point, the second point, and the third point in the third frame of reference.

In addition to one or more of the features described herein, or as an alternative, further embodiments of the system may include the processor is further operable to execute nontransitory computer instructions that, when executed on the processor, reconstructs 3D surface coordinates of the object based on the determined multiplicity of 3D coordinates of points on the first edge line and on a multiplicity of camera image points collected off the first edge line.

In addition to one or more of the features described herein, or as an alternative, further embodiments of the system may include the processor is further operable to execute nontransitory computer instructions that, when executed on the processor, adds color to the reconstructed 3D surface coordinates.

In addition to one or more of the features described herein, or as an alternative, further embodiments of the system may include the processor is further operable to execute nontransitory computer instructions that, when executed on the processor, attaches graphical elements to a visual representation of the object, the visual representation including the determined multiplicity of 3D coordinates of points on the first edge line.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 4A and FIG. 4B are front and section views, respectively, of the payload assembly according to an embodiment of the present invention;

FIG. 11 is a schematic illustration of a tracker obtaining 3D coordinates of continuous edge lines captured with a tracker camera, the tracker moving relative to a fixed object, according to an embodiment of the present invention;

FIGS. 12A, 12B, 12C are schematic illustrations of a tracker obtaining 3D coordinates of continuous edge lines captured with a tracker camera, the object moving on a conveyor belt, according to an embodiment of the present invention.

DETAILED DESCRIPTION

Figure 1:
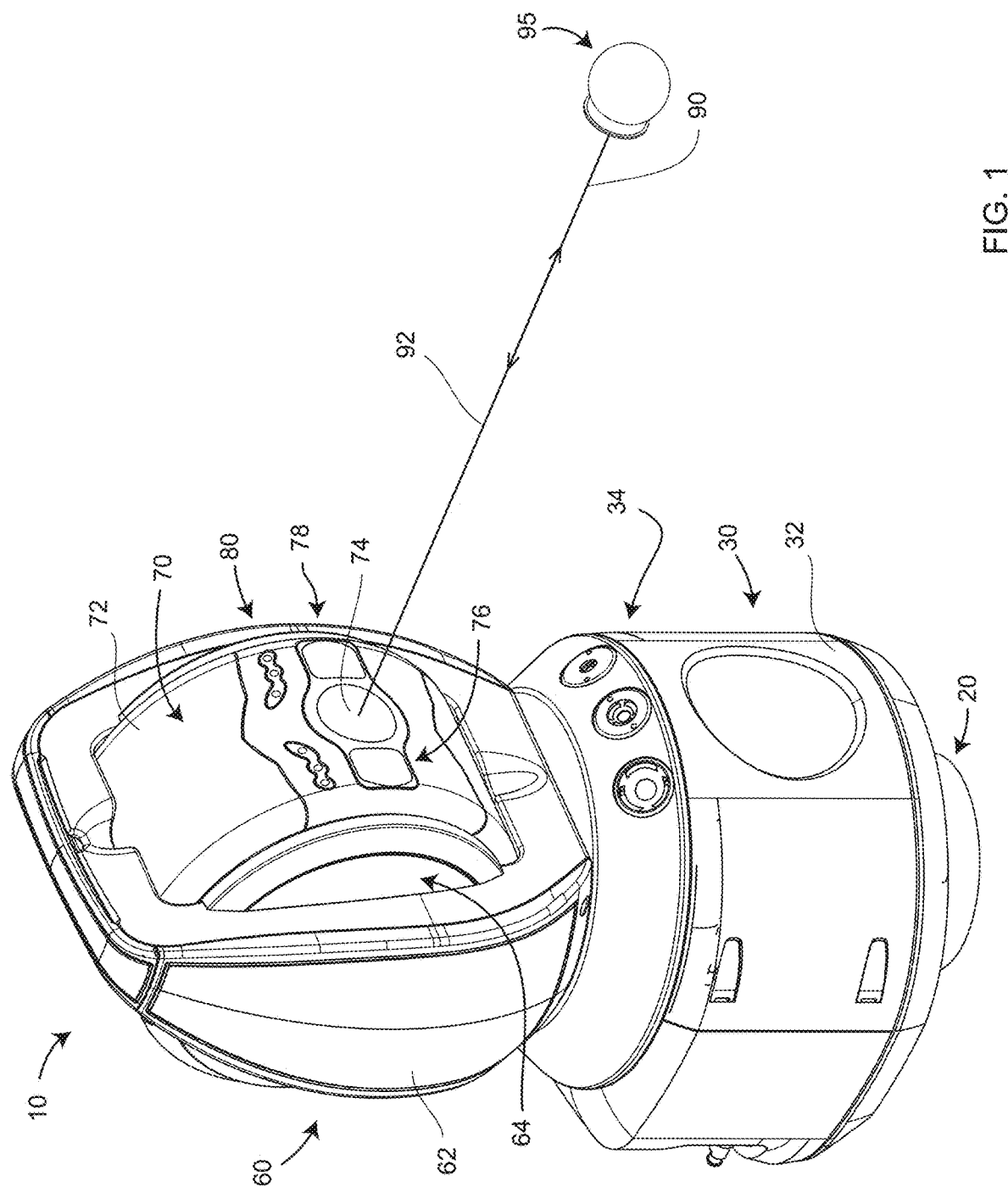
FIG. 1 is an isometric view of a tracker and a retroreflector in accordance with an embodiment of the present invention.

A tracker 10 is shown in FIG. 1. As used herein, the term "tracker" includes total stations. A total station is a type of laser tracker that is often used in land surveying applications. The beam of light 90 may come from a laser, a superluminescent diode, a light emitting diode (LED), or other type of collimated light source.

The tracker 10 in FIG. 1 emits or sends outgoing light 90 through an exit aperture 74 to a retroreflector 95, which reflects and returns the light along a parallel path as returning light 92, which passes a second time through the exit aperture 74. The tracker includes a base assembly 30, a yoke assembly 60, and a payload assembly 70. An outer portion of the payload assembly 70 includes payload assembly covers 72, a first target camera 76, a second target camera 78, and payload indicator lights 80. The target cameras 76, 78 are also referred to as locator cameras. In an embodiment, the indicator lights 80 may emit a predetermined first color, such as green for example, to indicate found target, a second predetermined color, such as red for example, to indicate measuring, and other predetermined colors, such as blue or yellow for example, for user-definable or six-degree of freedom (six-DOF) indications. In an embodiment, an outer portion of the yoke assembly 60 includes yoke-assembly covers 62 and yoke indicator lights 64. In an embodiment, yoke indicator lights may advantageously be seen at large distances from the tracker. An outer portion of the base assembly 30 includes base-assembly covers 32 and magnetic home-position nests 34 operable to hold SMRs of different diameters. In an embodiment, three magnetic home-position nests 34 accept SMRs having diameters of 1.5 inches, 0.875 inch, and 0.5 inch. A mandrel 20 may optionally be attached to a lower portion of the tracker 10.

Figure 2:
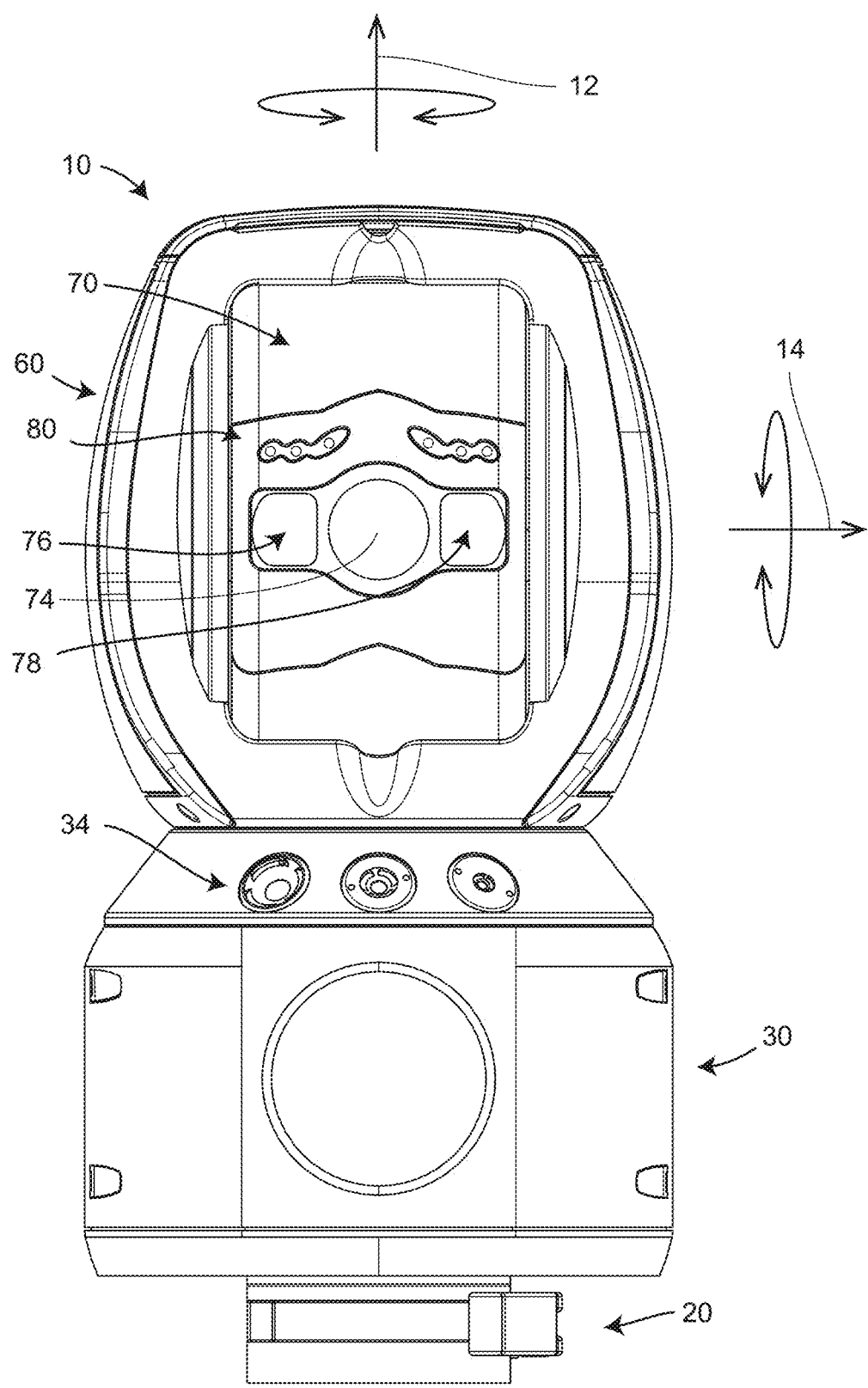
FIG. 2 is a front view of a tracker according to an embodiment of the present invention.

FIG. 2 shows a front view of the tracker 10. The base assembly 30 is ordinarily stationary with respect to a work area, for example, being mounted on an instrument stand or an industrial tripod. The yoke assembly 60 rotates about an azimuth axis 12, sometimes referred to as a standing axis or a vertical axis, although it should be appreciated that the tracker 10 may, in general, be positioned upside down or be rotated to an arbitrary angle with respect to a floor. The payload assembly 70 rotates about a zenith axis 14, sometimes referred to as a transit axis or a horizontal axis.

Figure 3A:
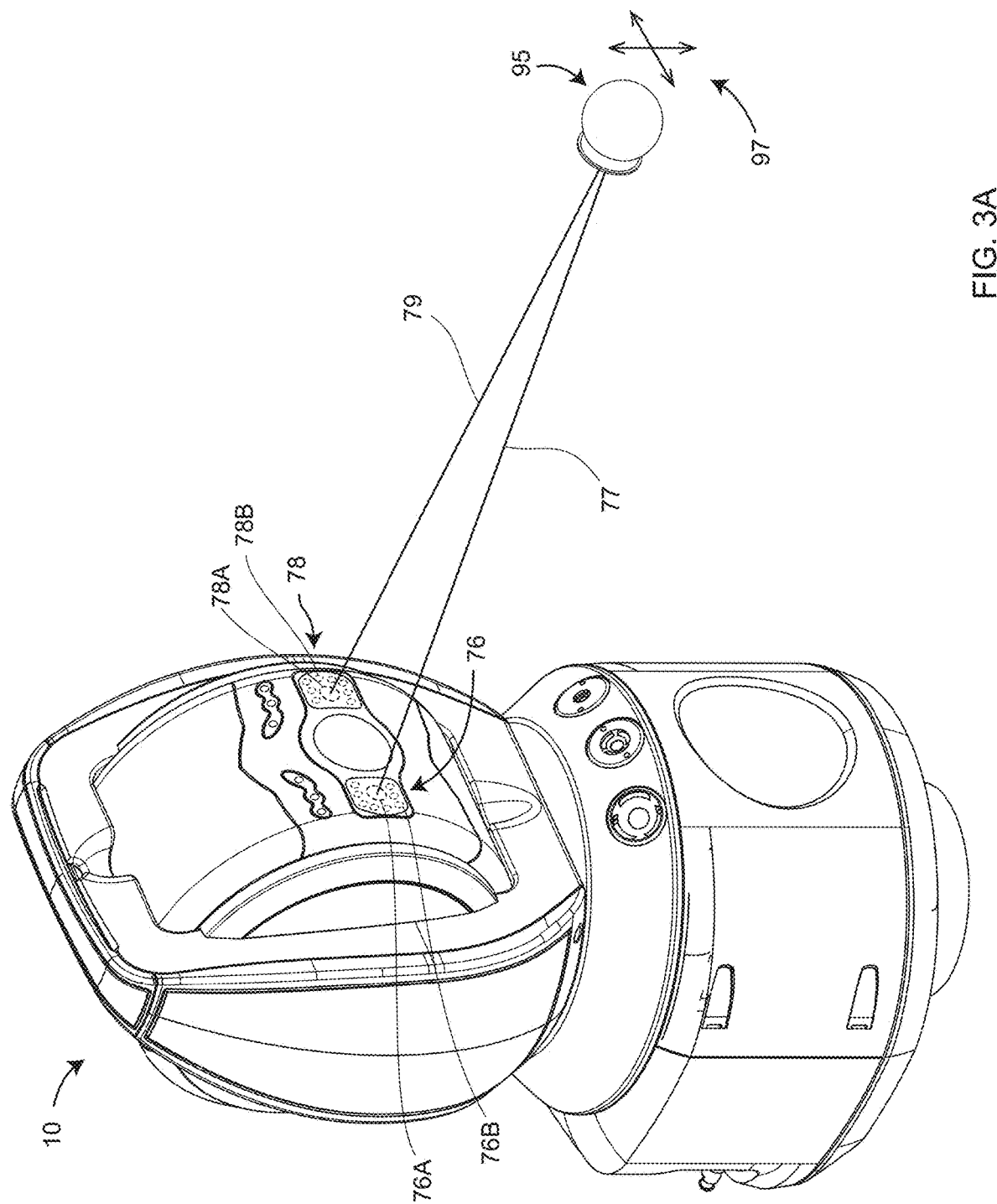
FIG. 3A is an isometric view of a tracker having an SMR illuminated by lights surrounding cameras according to an embodiment of the present invention.

In an embodiment illustrated in FIG. 3A, one or more target cameras 76, 78 are used to locate one or more retroreflectors 95 in an environment. A stereo pair of target cameras, such as cameras 76, 78, is described in commonly-owned U.S. Pat. No. 8,670,114 entitled "Device and Method for Measuring Six Degrees of Freedom", the contents of which are incorporated by reference herein. In an embodiment, the light sources 76B, 78B, located close to the camera photosensitive arrays 76A, 78A, are periodically flashed at regular intervals. The flashing lights 76B, 78B illuminate the retroreflector 95. Reflected beams of light 77, 79 travel to the photosensitive arrays 76A, 78A, respectively. In an embodiment, the image capture rate of the photosensitive arrays 76A, 78A is set to half the flash rate of the lights 76B, 78B so that the retroreflector 95 appears to be brightly and dimly illuminated in alternate images. In an embodiment, the dimly illuminated retroreflector images are subtracted from the brightly illuminated retroreflector images, thereby obtaining bright a bright image spot for each illuminated retroreflector. However, the light from the light sources 76B, 78B is not reflected in a concentrated manner from non-retroreflective objects. Consequently, background images when subtracted appear to be relatively dim compared to the retroreflectors. This use of flashing lights 76B, 78B greatly simplifies the identification of retroreflectors in the environment.

In an embodiment, the light sources 76B, 78B are light emitting diodes (LEDs) that emit light at a near infrared wavelength such as 850 nm. In an embodiment, the beam of light 92 shown in FIG. 1 is emitted at a different wavelength such as 635 nm, which corresponds to red light. In an embodiment, it is desirable for the cameras 76, 78 to accept visible wavelengths as well as the wavelengths emitted by the light sources 76B, 78B as this provides for the acquisition of color images that further show bright flashing spots of light at the locations of retroreflectors such as the retroreflector 95. The target cameras 76, 78 may also be used without turning on the lights 76B, 78B. In this mode of operation, color images may be obtained without retroreflectors 95 producing bright spots in captured 2D images.

The arrows 97 in FIG. 3A represent a movement 97 of the retroreflector 95 in a pattern to produce a spatial gesture. When the tracker settings are configured to receive such gestures, an operator may move the move the retroreflector in a predetermined spatial gesture such as a horizontal or vertical movement, for example. The movement of the retroreflector will be observed in a sequence of images acquired/obtained by the one or more target cameras such as the cameras 76, 78. A processor, such as the gestures pre-processor 526 (FIG. 5), evaluates the pattern to determine the meaning of the gesture. The operator may for example give a "come to this retroreflector" gesture, causing the beam of light to move from the retroreflector to which it is currently locked and to the retroreflector currently held by the user. Many other types of gestures are possible. Examples of such tracker gestures are described in commonly-owned U.S. Pat. No. 8,537,375 entitled "Method and Apparatus for Using Gestures to Control a Laser Tracker", the contents of which are incorporated by reference herein.

Figure 3B:
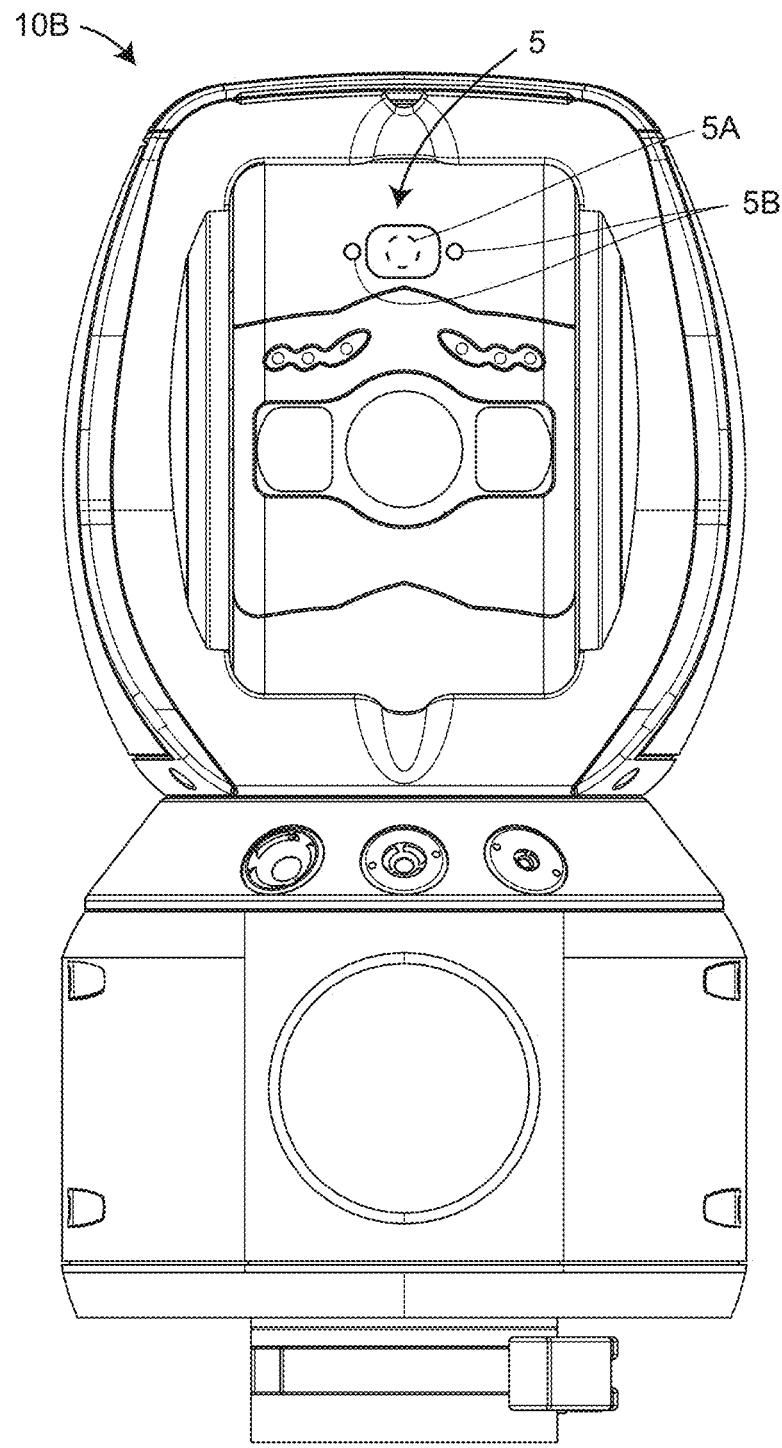
FIG. 3B is a front view of a tracker having a camera with a narrow field-of-view (FOV) as well as two cameras with wider FOVs according to an embodiment of the present invention.

FIG. 3B is a front view of a tracker 10B, which is the same as the tracker 10 of FIGS. 1 and 2 except that the tracker 10B further includes a narrow field-of-view (FOV) camera 5 having a photosensitive array 5A and light sources 5B. In an embodiment, the narrow FOV camera 5 captures a narrower FOV than the target cameras 76, 78.

FIG. 4A is a front view of the payload assembly 70 and an upper portion of the yoke assembly 60. FIG. 4B is a cross-sectional view D-D (FIG. 4A) showing optical elements within the payload assembly 70. Optical elements placed mainly along a central portion of the payload assembly 70 are referred to as a central-optics assembly 400, which includes a launch/collimator assembly 410 and a position-detector assembly 460. Outside the central-optics assembly 410 are an absolute distance meter (ADM) module 465 and an internal camera 470.

The combiner assembly 450 is used to combine the launch/collimator assembly 410 with the position-detector assembly 460, and it is also used to combine different beams of light from the position detector splitter 454 and the beam splitter 456. The position-detector assembly 460 includes a position detector 478 mounted on a position-detector circuit board 506. The position detector 478 is a sensor or a detector that converts light into electrical signals and further provides secondary electrical signals that enable determination of a position at which light strikes a surface area of the position detector 478. Examples of position detectors include a lateral effect detector, a quadrant detector, a complementary metal-oxide-semiconductor (CMOS) array, and a charge-coupled detector (CCD).

The position-detector assembly 460 is ordinarily used to keep the outgoing beam of light 90 centered or nearly centered on a moving retroreflector 95, thereby causing the returning beam of light 92 to follow the same path as the outgoing beam of light 90. A control system (also referred to as a tracking system) causes the tracker motors to steer the beam to keep moving the beam toward the center of the position detector, thereby enabling tracking of the retroreflector 95 with the tracker 10. In practice, when the outgoing beam is exactly centered on a retroreflector, the returning beam may be offset from a center of the position detector 478. The position on the position detector of the return beam when the outgoing beam is centered on the retroreflector is referred to as the retrace point of the position detector.

In an embodiment, the tracker 10 includes an internal camera that provides a high resolution color image over a relatively narrow FOV. In an embodiment, the beam splitter 456 is coated to reflect a color image into the internal camera 470.

Figure 5:
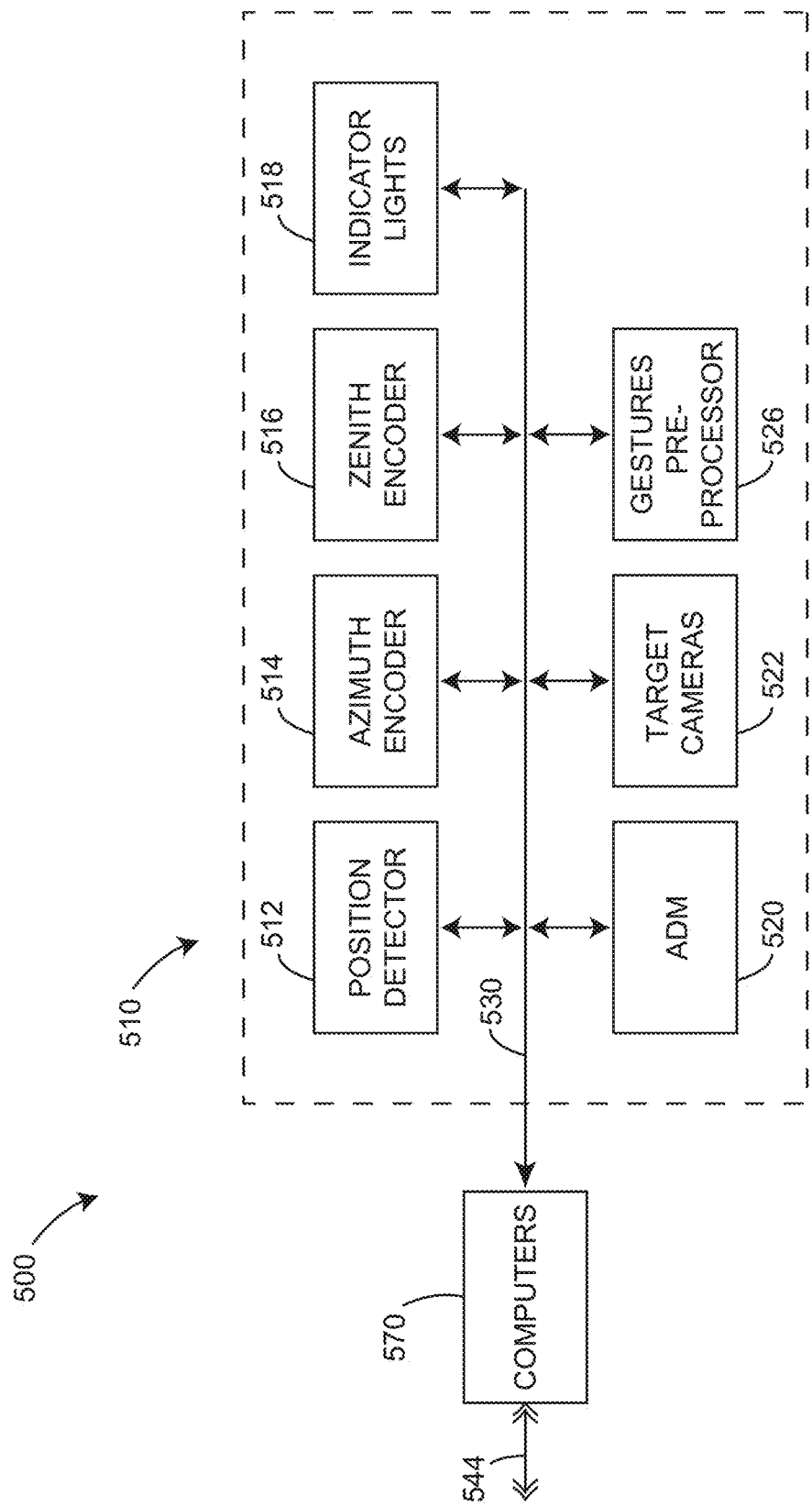
FIG. 5 is a schematic illustration of electrical and computing elements coupled to a tracker according to an embodiment of the present invention.

FIG. 5 shows a computing system 500 coupled to the tracker 10, either as computing components within the tracker or as external computing components coupled to the tracker computing system, possibly by a networking link such as a link 544. The term computing system as used herein is taken as having the same meaning as processing system or simply processor. The term processor as used herein is taken to include all components used to support computing. Memory elements such as registers, cache, volatile memory, non-volatile memory, and remote storage are included as a part of the processor. Devices such as central processing units (CPUs), field-programmable gate arrays (FPGAs), digital signal processors (DSPs), and all support electronics that connect together computing and memory components are also included. Input/output devices through which the computing and memory elements receive information, including possibly from a user, are also included as a part of the processor. An embodiment of computing functions 510 found in a laser tracker 10 are shown in FIG. 5. In an embodiment, these include position detector processing 512, azimuth encoder processing 514, zenith encoder processing 516, indicator lights processing 518, absolute distance meter (ADM) processing 520, target camera processing 522, and gestures pre-processing 526. It should be appreciated that illustrated processing components or circuits are exemplary and not intended to be limiting. In other embodiments, additional or fewer processing functions may be included within the tracker. The processing elements within the tracker are connected to one another and to external computers 570 through a bus 530. Communication with external computers, including networked computers, may be carried out through any known wired or wireless communication channels.

The optical axis of the tracker is the axis through which the beam of light 92 leaves the tracker and returns to the tracker. The position of the retroreflector in the first images indicates the direction the position of the retroreflector 95 in space in relation to the tracker. Positions on the photosensitive arrays 76A, 78A of the target cameras 76, 78 are indicative of angles of objects in relation to a perspective center of the camera lens systems. Hence the positions of a retroreflector 95 on first images of the cameras 76, 78 may be used to determine the angles to points on an object of interest in relation to the cameras 76, 78.

Figure 12A:
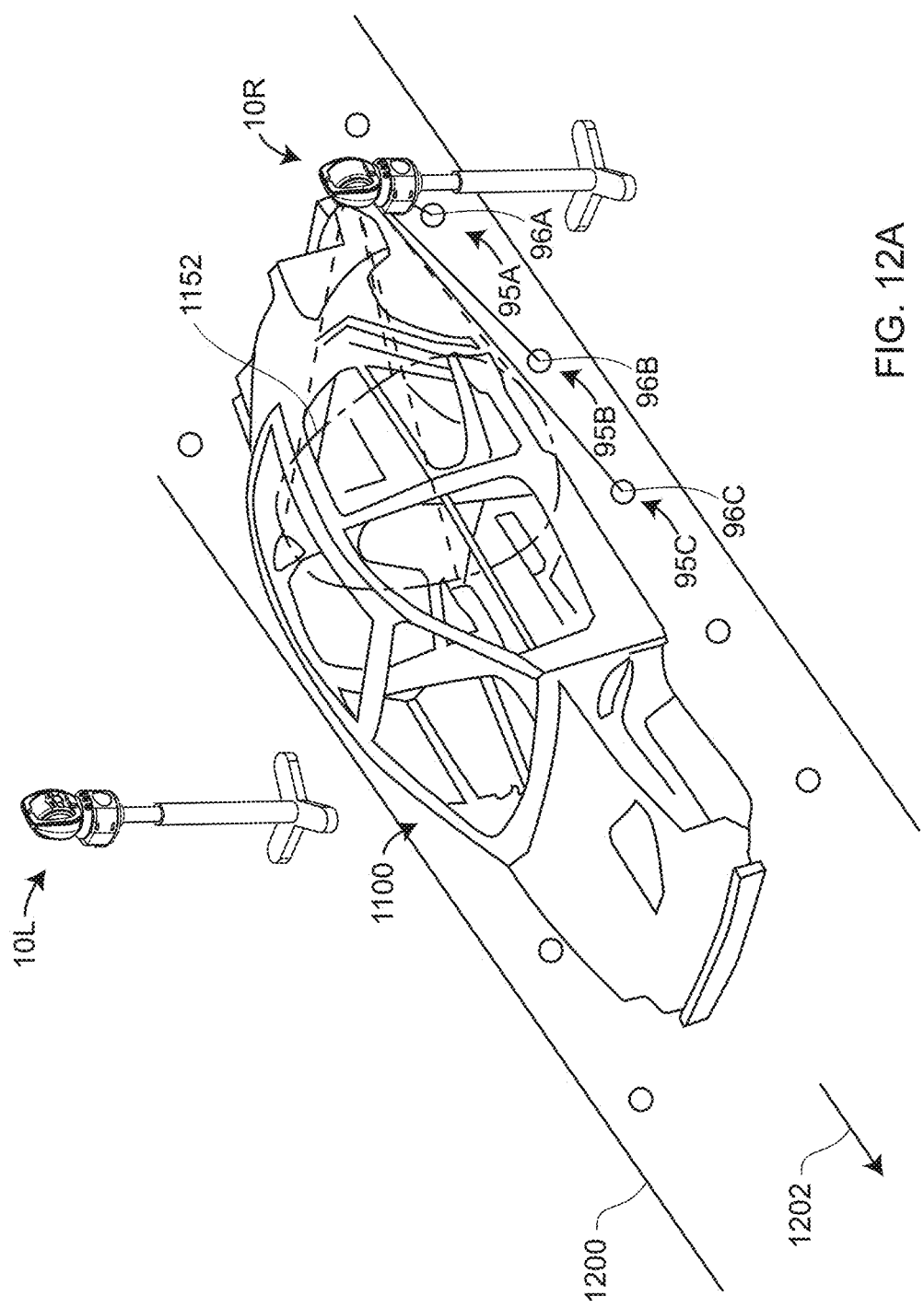
Figure 12C:
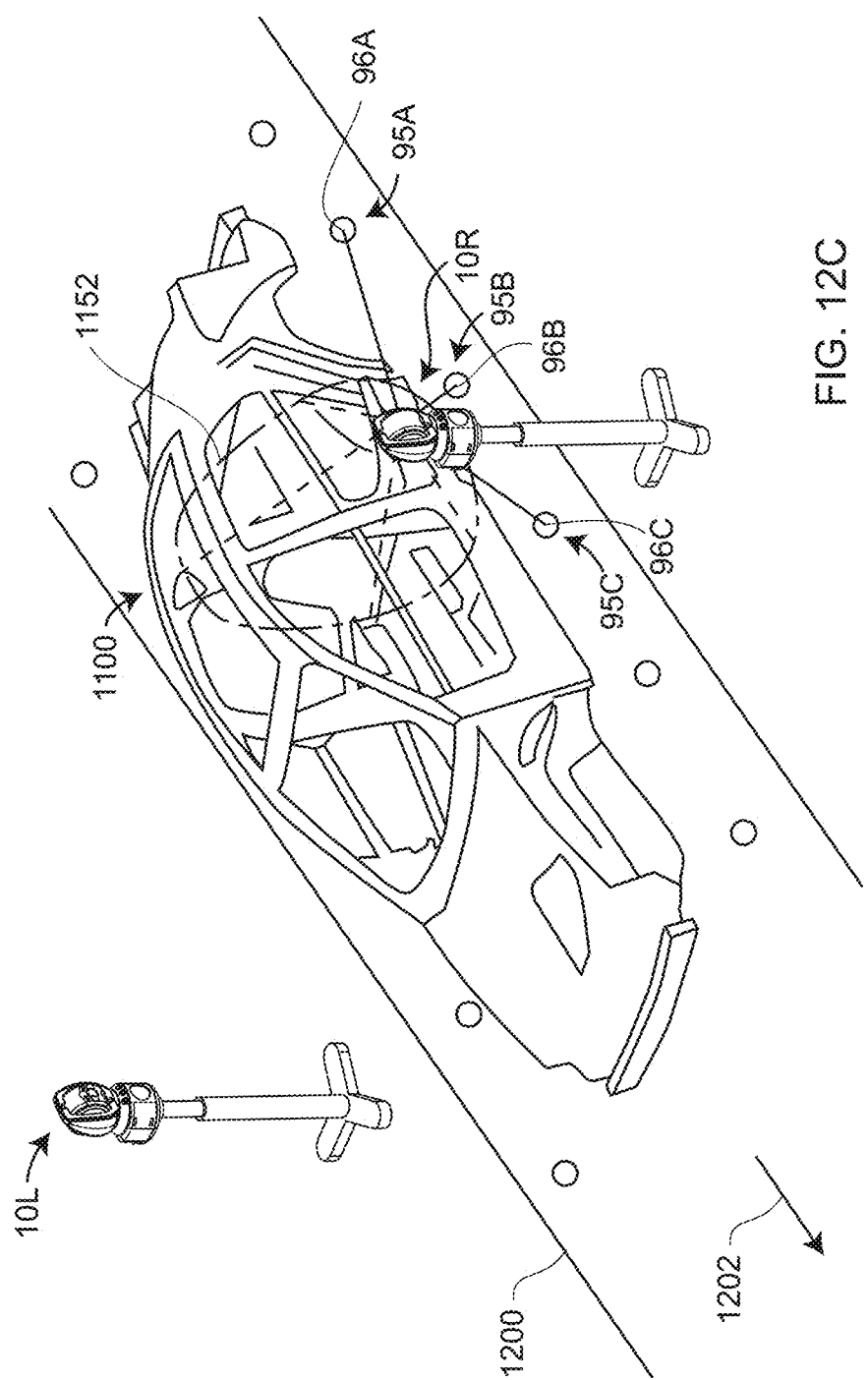

In an embodiment, an object may be measured by a tracker placed at multiple different locations relative to an object. It may be that the object is stationary while the tracker is moved to the multiple different objects, or it may be that the tracker is held fixed in location, while the object is moved to multiple different locations. Regardless, the objective of changing the relative pose of the tracker and the object is to allow the tracker to make 3D measurements on multiple portions of an object or on multiple sides of an object. In some of the illustrated embodiments, the object is taken as stationary while the tracker is taken as moving. It should be appreciated, however that the reverse case may also be true. For example, when an object is moving on a conveyor best while the tracker is held stationary. This embodiment is illustrated in FIGS. 12A, 12B, 12C and discussed below. For purposes of clarity, the tracker is generally illustrated and described as moving to different locations while the object is held fixed. However, it should be understood that the relative motion may likewise result from movement of the object.

Figure 6A:
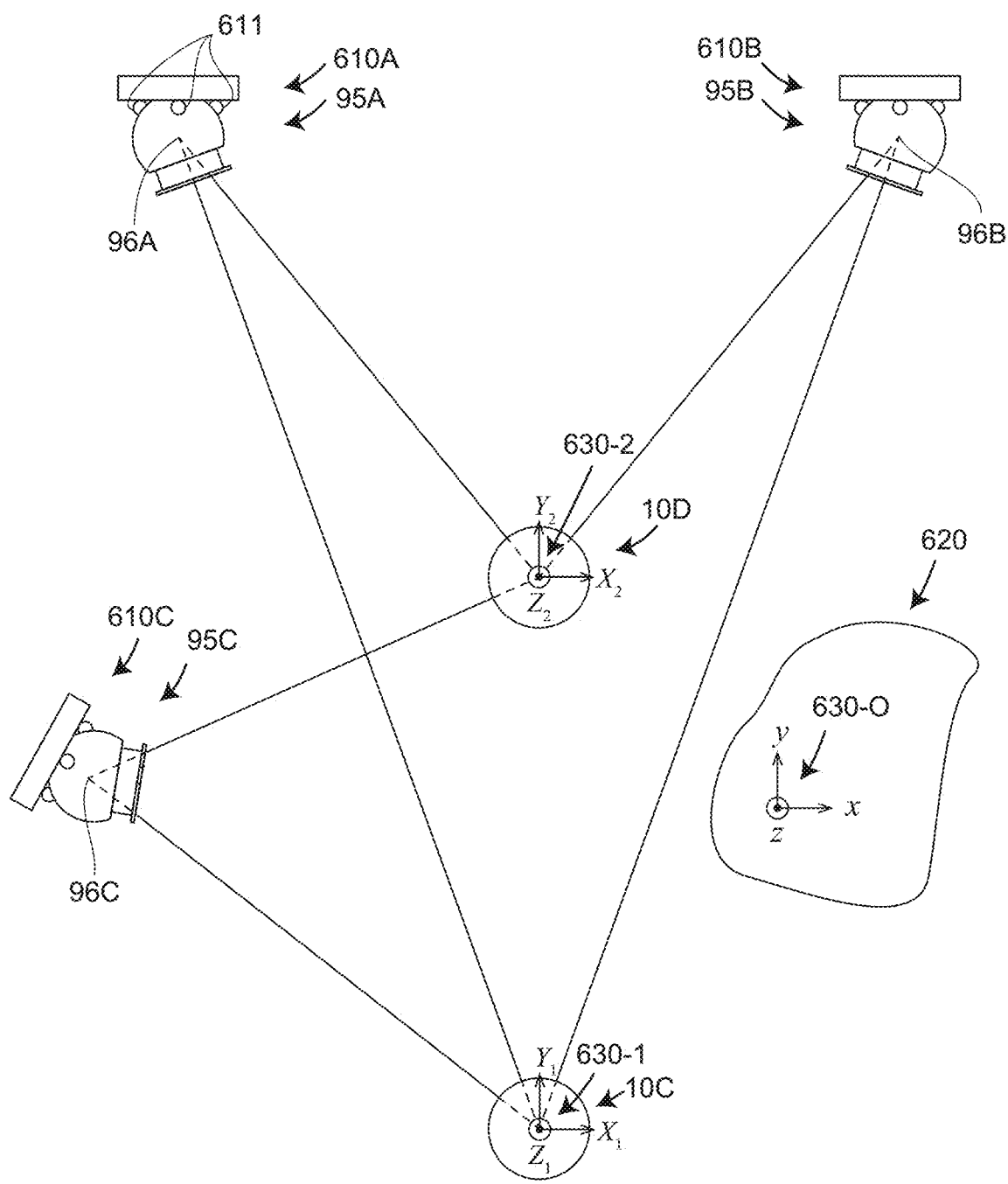
FIG. 6A is a schematic representation of a tracker measuring three retroreflectors and an object, the tracker being positioned at two locations relative to the object, according to an embodiment of the present invention.

FIG. 6A illustrates an embodiment that enables 3D measurements made by a tracker in multiple locations relative to an object frame of reference. The object frame of reference as here defined is a frame of reference fixed with respect to the object. In an embodiment illustrated in FIG. 6A, a tracker 10 in a first location C is denoted as tracker 10C. The same tracker 10 at a different location D is denoted as tracker 10D. The tracker 10 at location C and at location D measure 3D coordinates of different sides of the object 620. The 3D coordinates of the object are determined by measuring a distance from the tracker 10 to the object along with the angles of rotation of the payload about the azimuth axis 12 and zenith axis 14.

In an embodiment, the tracker 10 at either location C or location D has an internal tracker frame of reference with tracker axes $X_T$, $Y_T$, $Z_T$ tied to the specific geometry of the tracker 10. In an embodiment, the internal tracker frame of reference has an origin at 3D coordinates (0, 0, 0) at the tracker gimbal point, which is the ideal center of mechanical rotation of the tracker. In an embodiment, the $X_T$ axis is pointed forward (toward the SMR 95 in FIG. 1), the $Y_T$ axis is pointed to the tracker's left (to the right in FIG. 2), and the $Z_T$ axis is pointed upward (along the direction of axis 12 in FIG. 2). The corresponding tracker 10 at location D has the same axes $X_T$, $Y_T$, $Z_T$ in its internal tracker frame of reference.

The 3D measurements obtained by the tracker 10 at the location C and the 3D measurements obtained by the tracker 10 at the location D are transformed into an object frame of reference 630-O, which has three mutually perpendicular coordinate axes x, y, z. The tracker at the location C has a first frame of reference 630-1 with axes $X_1$, $Y_1$, $Z_1$. In general, each of the axes $X_1$, $Y_1$, $Z_1$ are translated and rotated relative to the axes x, y, z of the object frame of reference 630-0. The tracker at the location D has a second frame of reference 630-2 with axes $X_2$, $Y_2$, $Z_2$. In general, each of the axes $X_2$, $Y_2$, $Z_2$ are translated and rotated relative to the axes x, y, z of the object frame of reference.

To consistently combine 3D coordinates measured by the tracker at the location C with the 3D coordinates of the tracker at the location D, a procedure is performed to transform the 3D coordinates of the object 620 measured by the tracker 10 in the first frame of reference 630-1 at the location C and by the tracker 10 in the second frame of reference 630-2 at the location D into 3D coordinates in the object frame of reference 630-O. Such a transformation may be made by performing a mathematical transformation procedure. Many types of mathematical transformation procedures are equivalent and may be used. In an embodiment, a rotation matrix and a translation matrix are applied in turn to each of the measured 3D coordinates. In an embodiment, this mathematical transformation procedure is applied to the 3D coordinates measured at locations C and D, with the values of the rotation matrix and the translation matrix differing for the locations C and D. The result is to place all the 3D coordinates measured at locations C and D into the single object frame of reference 630-O.

A way to collect the information needed to transform 3D coordinates from the tracker frame of reference to the global frame of reference is now described. The retroreflectors 95A, 95B, 95C are all fixed in the object frame of reference 630-O, which means that they are fixed with respect to the object 620. The retroreflectors 95A, 95B, 95C have central reflection points 96A, 96B, 96C, also referred to herein as the first point, the second point, and the third point, respectively. For the case of an SMR that contains a cube-corner retroreflector, the central reflection point is at the vertex of the cube-corner, which is located at the center of the SMR sphere.

In an embodiment, the tracker 10 at location C measures the central reflection points 96A, 96B, and 96C, and the tracker 10 at location D also measures the central reflection points 96A, 96B, 96C. These measured points are used to transform the measured 3D coordinates at the locations C and D into the object frame of reference 630-O. In a simple exemplary case, the first frame of reference 630-1 of the tracker at location C is also taken as the object frame of reference 630-O. Since the second frame of reference 630-2 must be different than the first frame of reference 630-1, the second frame of reference 630-2 cannot in this instance coincide with the object frame of reference 630-O. Other tracker measurements, for example, of features on the object 620 from the tracker at location C or D, could be used to determine transformations fixing the global frame of reference to some features of the object. However, at a minimum, the three measurements of the central reflection points 96A, 96B, 96C from the tracker 10 at locations C and D provide the information needed to place 3D coordinates of points measured on the object 620 into the object frame of reference 630-O.

In an embodiment, the reflection points 96A, 96B, 96C are the vertexes of cube-corner retroreflectors centered in SMRs. In an embodiment, the SMRs 95A, 95B, 95C are placed on kinematic nests 610A, 610B, 610C. In an embodiment, each kinematic nest includes three spherical contact points 611 in contact with the spherical surface of the SMRs 95A, 95B, 95C. Other types of kinematic mounts are possible, and kinematic nests 610A, 610B, 610C are not limited to having spherical contact points. In an embodiment, a kinematic nest includes a magnet that securely holds a ferromagnetic SMR in place. Note that the SMRs 95A, 95B, 95C may be rotated on the kinematic nests 610A, 610B, 610C, respectively, without changing the location of the sphere center or vertex. This property of the kinematic nests when used with the SMR enables the SMRs to retain constant 3D coordinate values for the reflection points 96A, 96B, 96C as the SMRs is pointed to a beam of light from each tracker 10 at locations C and D or other locations in space.

It should be noted that other types of retroreflectors besides cube-corner retroreflectors or SMRs may be used. For example, one or more of the retroreflectors may be cateye retroreflectors. Such cateye retroreflectors may be made in a variety of ways. In one embodiment, the cateye retroreflector is made of two hemispherical glass elements joined at their flat surfaces and arranged so as to focus the light to a point at a rear surface of one of the two hemispheres. Such cateye retroreflectors may have an acceptance angle of +/−60 degrees, which is approximately twice the acceptance angle of a typical SMR. In embodiments, a variety of retroreflector types may be used.

The description given above is for a single tracker 10 moved to two different locations C and D to measure 3D coordinates of an object 620 from different directions before combining the measured 3D coordinates into a common object frame of reference. Although this is a common approach in practice, it is also possible to mount two different trackers at the locations C and D and to measure 3D coordinates of points on the object 620 with both trackers.

Figure 6B:
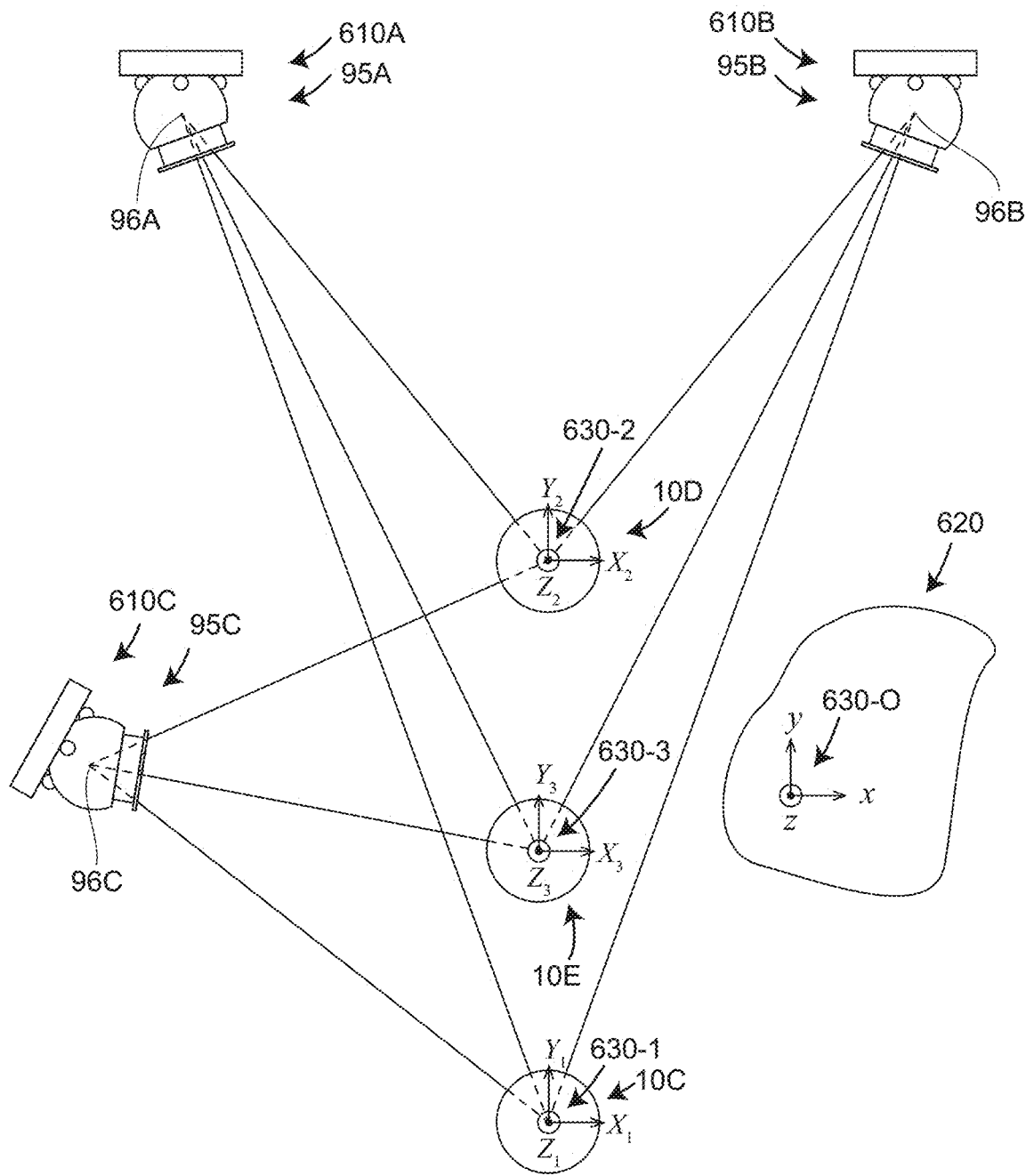
FIG. 6B is a schematic representation of a tracker measuring three retroreflectors and an object, the tracker being positioned at three locations relative to the object, according to an embodiment of the present invention.

The situation described in reference to FIG. 6A was for the case in which 3D coordinates measured by the tracker at two different locations C and D were combined into a collection of 3D coordinates in the object frame of reference 630-O. For the case in which a camera coupled to the tracker 10 is used to capture 2D images to obtain 3D coordinates of continuous edge lines, tracker images must be obtained with the tracker 10 placed in at least three different locations such as the locations C, D, and E in FIG. 6B, with the tracker 10 at these locations are indicated by trackers 10C, 10D, 10E. At each location C, D, E, the tracker 10 measures the central reflection points 96A, 96B, 96C. In addition, the tracker 10 captures an image of a first common region of the object at each of the three locations C, D, E. The measurements of the central reflection points 96A, 96B, 96C enables the relative pose of the tracker to be determined at each of the three locations C, D, and E. The term pose is here used to mean the relative position and orientation of the tracker at the locations C, D, and E. In an embodiment, a processor 500 determines 3D coordinates at arbitrary points on edge lines of an object as seen in tracker 2D camera images. Such arbitrary points may lie on continuous or discontinuous points of the edge lines. The method for using the measurements shown in FIG. 6B is further described herein below in reference to FIGS. 11, 12, 13 using concepts developed in reference to FIGS. 7A, 7B, 8, 9, 10.

A question that may arise is how the frame of reference of the tracker 10, with tracker axes $X_T$, $Y_T$, $Z_T$ is associated with the geometry of the tracker 10, are related to the frame of reference of the tracker camera, which in different embodiments is one or more of the cameras 76, 78, 5, 470. Each tracker camera has a fixed camera frame of reference that is fixed relative to the internal frame of reference of the tracker. Internal compensation procedures are used to determine this camera frame of reference relative to the internal frame of reference of the tracker. In general, such compensation procedures involve measuring objects at different positions relative to the internal tracker frame of reference, and then deducing from the collected results such parameters as the perspective center of the camera relative to the tracker origin, the focal length of the camera lens, the tilt of the camera photosensitive array relative to the tracker axes $X_T$, $Y_T$, $Z_T$, and so forth. Such compensation measurements may also provide information needed to correct for camera aberrations such as distortion.

In the methods described herein, a preliminary step is to identify those parts of the images that are edges. There are several methods that may be used to determine which image portions are edges and then to locate the edges on the captured images. In an embodiment, a method of edge detection based on a partial area effect is used. This method is described in "Accurate subpixel edge location based on partial area effect" in Image and Vision Computing 31 (2013) 72-90 by Trujillo-Pino, et al., hereafter referred to as Trujillo-Pino [2013], the contents of which are incorporated herein by reference. In other embodiments, other techniques such as moment-based techniques, least-squared-error-based techniques, or interpolation techniques, may be used. The effect of noise inherent in 2D images may be reduced by reconstructing smooth lines where appropriate. Examples of constructions that assume the presence of straight lines, circular curves, and polynomial curves are described in the Trujillo-Pino [2013]. Such smoothing methods are examples of noise-reducing filtering techniques that are used in embodiments described herein.

Figure 7A:
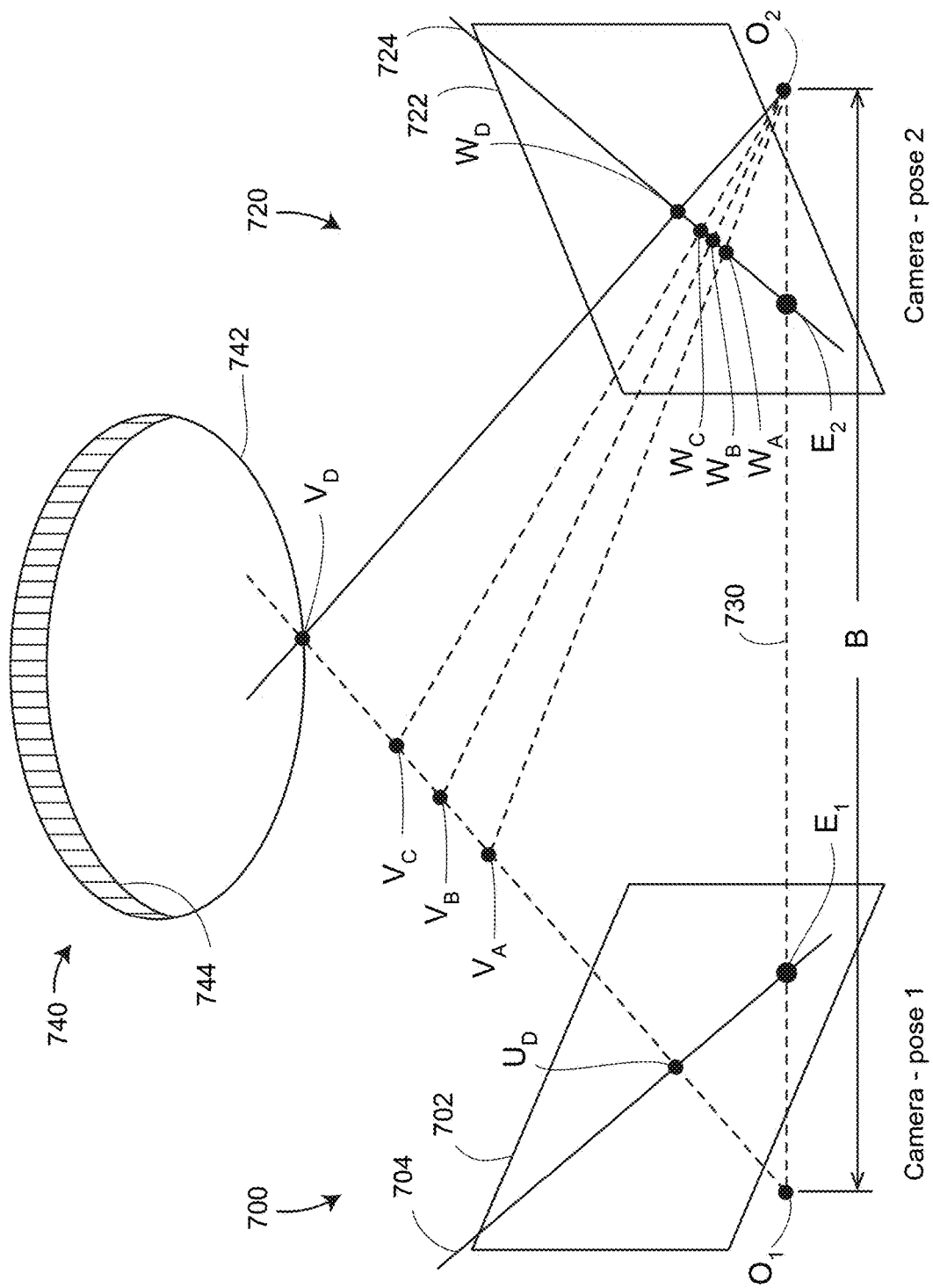
FIG. 7A is a schematic illustration of camera epipolar lines drawn for a point on a continuous line according to an embodiment.

As explained above, the term "pose" as used herein refers to the six degrees of freedom of a rigid body. Hence the pose of a tracker fully describes the frame of reference of the laser tracker within some global frame of reference. In FIG. 7A, a camera assembly in its first pose is designated 700 and in its second pose is designated 720. In each pose the cameras view edges of an object feature 740. In the example of FIG. 7A, the object feature 740 is hole having an upper edge 742 and a lower edge 744. The camera in the first pose 700 has a perspective center $O_1$, which is the point from which rays of light from the feature 740 appear to pass before reaching the camera photosensitive array when the camera is in the first pose. An epipolar plane 702 is established by projecting the plane of the camera photosensitive array symmetrically about the perspective center $O_1$. An epipolar plane is in general mathematically equivalent to the plane of the photosensitive array in the mathematical method that follows. Because the camera geometry is easier to visualize using epipolar planes than planes of photosensitive arrays, epipolar planes are discussed herein. For the camera in the first pose 700, the epipolar plane is 702.

The camera in the second pose 720 has a perspective center $O_2$, which is the point from which rays of light from the feature 740 appear to pass before reaching the camera photosensitive array when the camera is in the second pose. An epipolar plane 722 is established by projecting the plane of the camera photosensitive array symmetrically about the perspective center $O_2$. The epipolar plane 722 is in general mathematically equivalent to the plane of the photosensitive array in the method described herein below. For the camera in the second pose, the epipolar plane is 722.

A line drawn between the perspective center $O_1$ and the perspective center $O_2$ is referred to as the baseline 730 between the camera in the first pose 700 and the camera in the second pose 720. The length of the baseline 730 is B. The baseline intersects the epipolar plane 702 at the epipole $E_1$, and it intersects the epipolar plane 722 at the epipole $E_2$. Consider a point $V_D$ on the edge 742. A line from this point through the perspective center $O_1$ intersects the epipolar plane 702 at the point $U_D$. A line drawn from the point $V_D$ through the perspective center $O_2$ intersects the epipolar plane 722 at the point $W_D$. A line that resides on an epipolar plane and that also passes through the epipole of that plane is referred to an epipolar line. The epipolar line 704 includes the point $U_D$, and the epipolar line 724 includes the point $W_D$. Because the points $O_1$, $O_2$, $E_1$, $E_2$, $W_D$, $U_D$, and $V_D$ all lie in a common plane, as do the epipolar lines 704 and 724, it follows that, if one epipolar line is known, there is enough information to determine the location of the other epipolar line. So if the epipolar line 704 is known, the epipolar line 724 may immediately be drawn.

If it is determined that the camera in the first pose 700 sees the point $V_D$ on the edge 742 as the point $U_D$ on the epipolar line 704, it follows that the camera in the second pose 720 will see the point $V_D$ as lying on the epipolar line 724, for example, as one of the points $W_A$, $W_B$, $W_C$, $W_D$ corresponding to the matching points $V_A$, $V_B$, $V_C$, $V_D$. If the edge 742 is smoothly continuous over a portion of the edge 3942 that includes the point $V_D$, then a one-to-one correspondence between the points $W_D$ and $U_D$ cannot be obtained from the epipolar analysis alone.

Figure 7B:
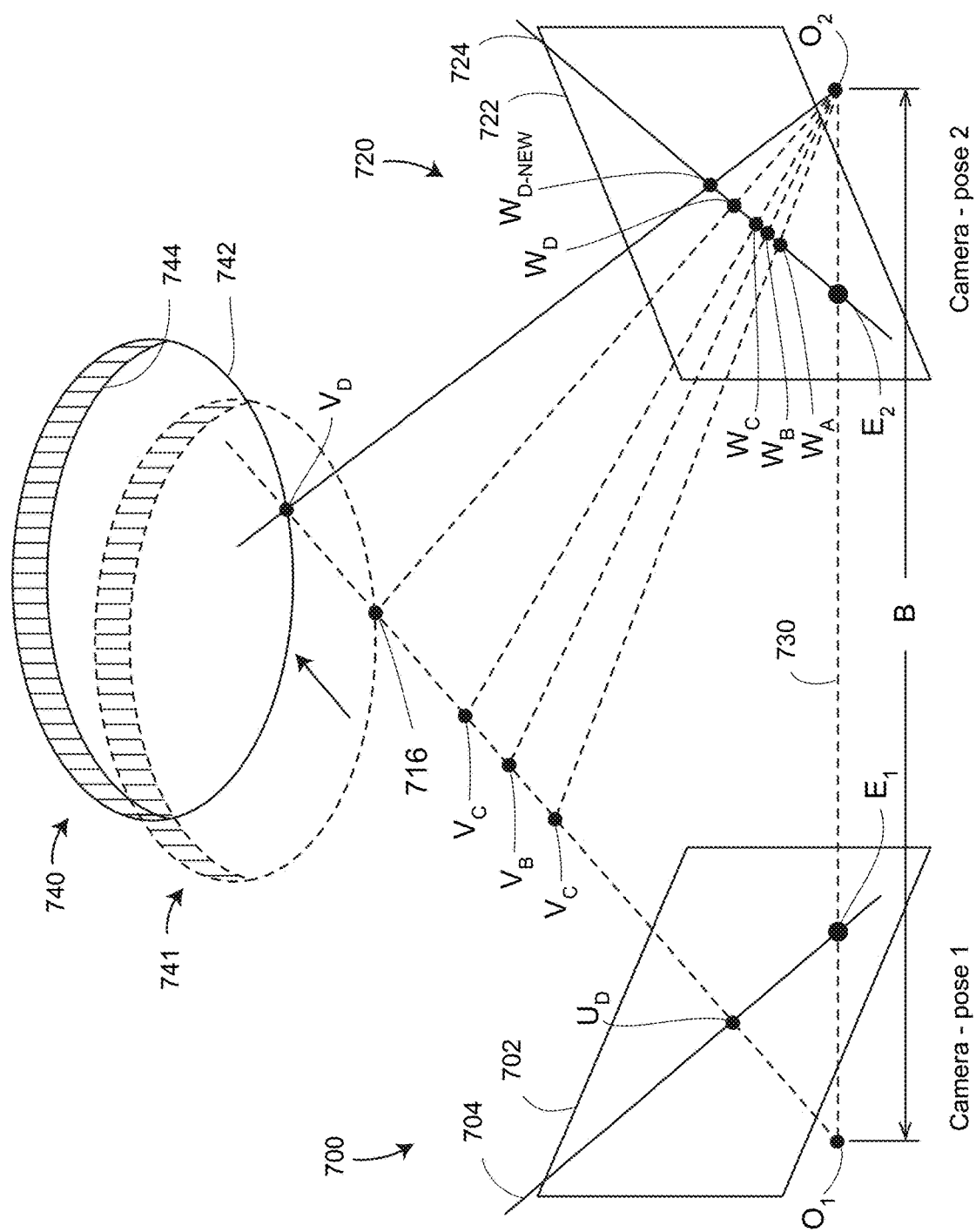
FIG. 7B is a schematic illustration of camera epipolar lines drawn for a point on a continuous line shifted in depth according to an embodiment.

FIG. 7B shows the case in which the point $U_D$ projected onto the epipolar plane 702 from the point $V_D$ does not uniquely define the position of the point $V_D$ on the epipolar line 724. For example, the point $V_D$ on the actual edge 742 of the actual hole 740 may have been mistakenly considered to lie on the edge of the hole 741 at the position 716. Because the edge 742 is smoothly continuous at the position of $V_D$, there may be no way to make a direct matching of image points on the epipolar planes 702 and 722 unless some additional visual clues are present in the captured 2D images. In FIG. 7A, the point $W_D$ on the epipolar line 724 was thought to correspond to the point $V_D$ on the actual hole 740, whereas in fact the point $W_D$ is shown in FIG. 7B to correspond to the position 716 in FIG. 7B rather than the true point $V_D$, which is matched by the point $W_{D-NEW}$ on the epipolar line 724. In the embodiment illustrated in FIGS. 7A, 7B, a different method is used to determine the true position in space of the edges 742, 744 of the object feature 740.

Figure 8:
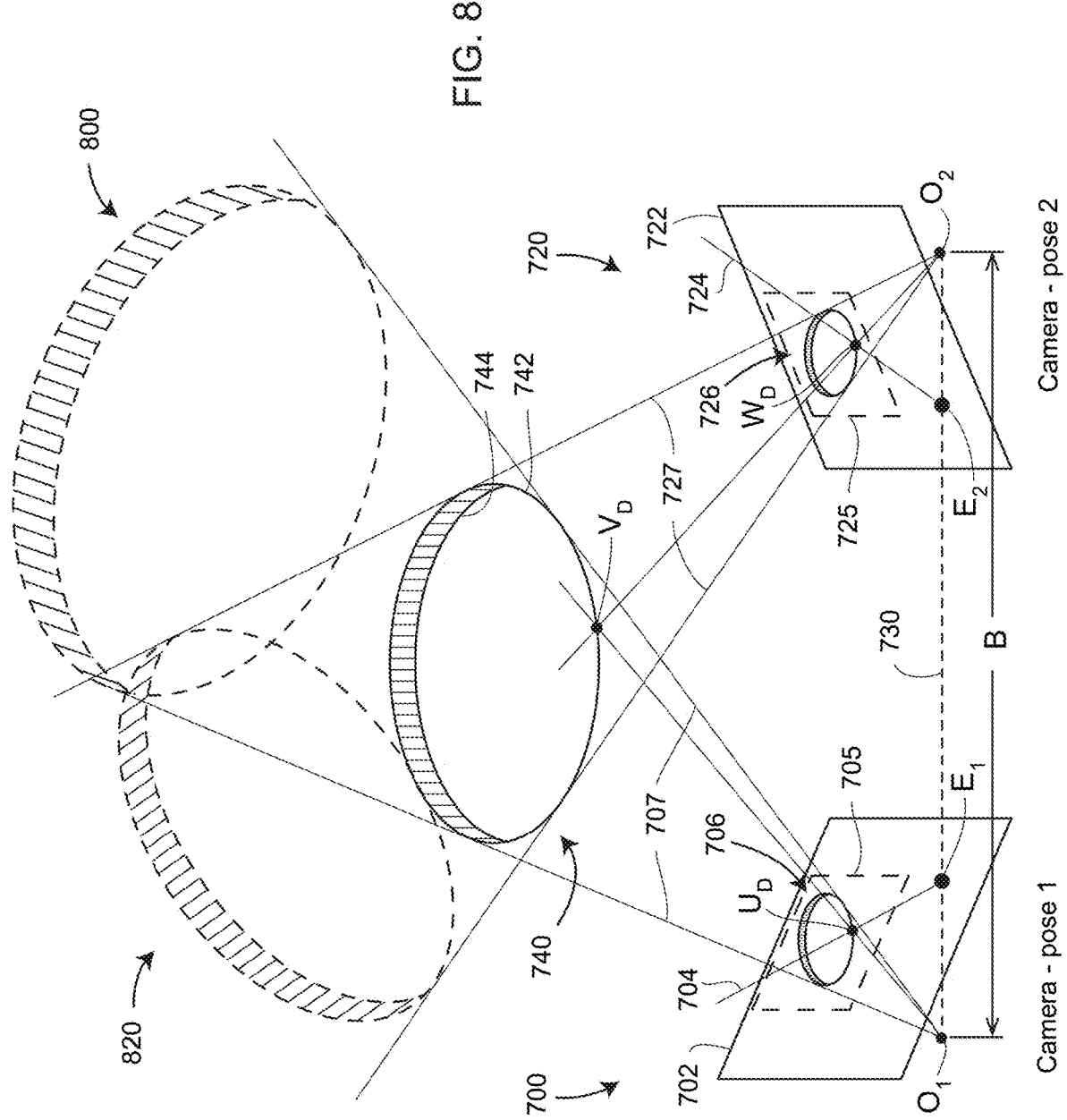
FIG. 8 is a schematic illustration showing corresponding points on a continuous object line and on camera image planes according to an embodiment.

FIG. 8 illustrates a method for determining the 3D coordinates of edge points on an object feature. The example shown in FIG. 8 is for an embodiment in which the edge features reside on a plane, but methods described herein below generalize the method to extract 3D coordinates of edge points for objects having edge points that are not coplanar.

In the first pose 700, the camera has a perspective center $O_1$ and an epipolar plane 702. The photosensitive array of the camera captures an image 706 over an area corresponding to the region 705 of the epipolar plane 702. The image 706 of the object 740 appears on the photosensitive array of the camera and correspondingly on the epipolar plane 702, further corresponding to an angular range 707. Without further knowledge, the object 740 corresponds to a projection 800 defined by the angular extent 707. The camera in the second pose 720 has a perspective center $O_2$ and an epipolar plane 722. The photosensitive array of the camera captures an image 726 over an area corresponding to the region 725 of the epipolar plane 722. The image 726 appears on the photosensitive array of the camera and correspondingly on the epipolar plane 722, further corresponding to an angular range 727. Without further knowledge, the object 740 corresponds to a projection 820 defined by the angular extent 727. A point $V_D$ on the edge 742 projects an image point $U_D$ on the epipolar plane 702 and an image point $W_D$ on the epipolar plane 722. Epipoles $E_1$ and $E_2$ are obtained as described herein above with respect to FIGS. 7A, 7B. An epipolar line 704 may be drawn from $O_1$ through the image point $U_D$ and a corresponding epipolar line 724 may be drawn, but the location of the image point $W_D$ on the epipolar line 724 cannot be determined without further information since the edge point $V_D$ is not an interest point that enables direct determination of the correspondence between the points $U_D$ and $W_D$.

Figure 9:
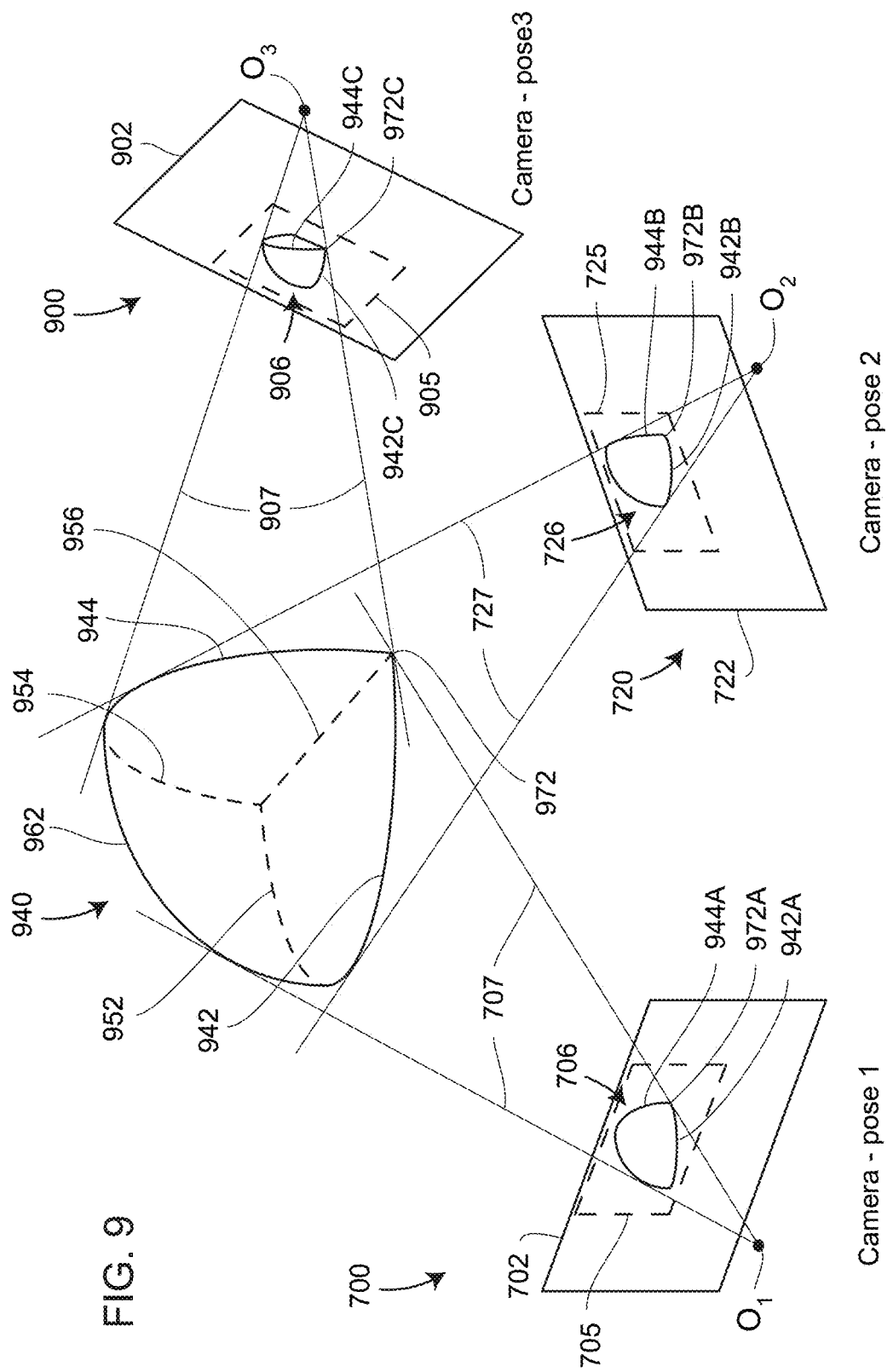
FIG. 9 is a schematic illustration of a 3D object and corresponding images in three camera poses according to an embodiment of the present invention.

For the general case in which edge features do not necessarily lie on a plane, the 3D coordinates of the edge features may be determined by further adding the camera assembly at a third pose 900 as shown in FIG. 9. The camera assembly at the third pose 900 has a perspective center $O_3$ and an epipolar plane 902. The photosensitive array of the camera captures an image over an area corresponding to the region 905 of the epipolar plane 902. An image 906 of the object 940 appears on the photosensitive array of the camera and correspondingly on the epipolar plane 902, further corresponding to an angular range 907. In the example of FIG. 9, the object 940 includes an edge 942 corresponding to line 942A in the image 706, the line 942B in the image 726, and the line 942C in the image 906. The object 940 further includes an edge 944 corresponding to the line 944A in image 706, the line 944B in the image 726, and the line 944C in the image 906. The object 940 further includes an intersection point 972 formed by the intersections of the lines 942 and 944. The point 972 corresponds to a point 972A in the image 706, a point 972B in the image 726, and a point 972C in the image 906.

In the example of FIG. 9, the object 940 shown is a quarter of a sphere. For the position of the quarter sphere 940 in relation to the camera poses 700, 720, 900, the edges 952, 954, 956 are hidden from view of the camera(s). The edges 942, 944, 962 are seen by the cameras as smooth surfaces with no distinct intersection points, but the point 972 is clearly seen by the cameras as the intersection point 972. Methods are well known for determining 3D coordinates of points that are individually recognizable by cameras in multiple different poses as distinguishable from other nearby points. Such methods are generally referred to as feature detection and may include many different types such as scale-invariant feature transform (SIFT), edge detection, corner detection, and blob detection. However, such methods do not apply to determination of 3D coordinates of smoothly continuous points such as the 3D coordinates of lines such as 942, 944, or 962. The methods described herein provide a way to determine such 3D coordinates.

Figure 10:
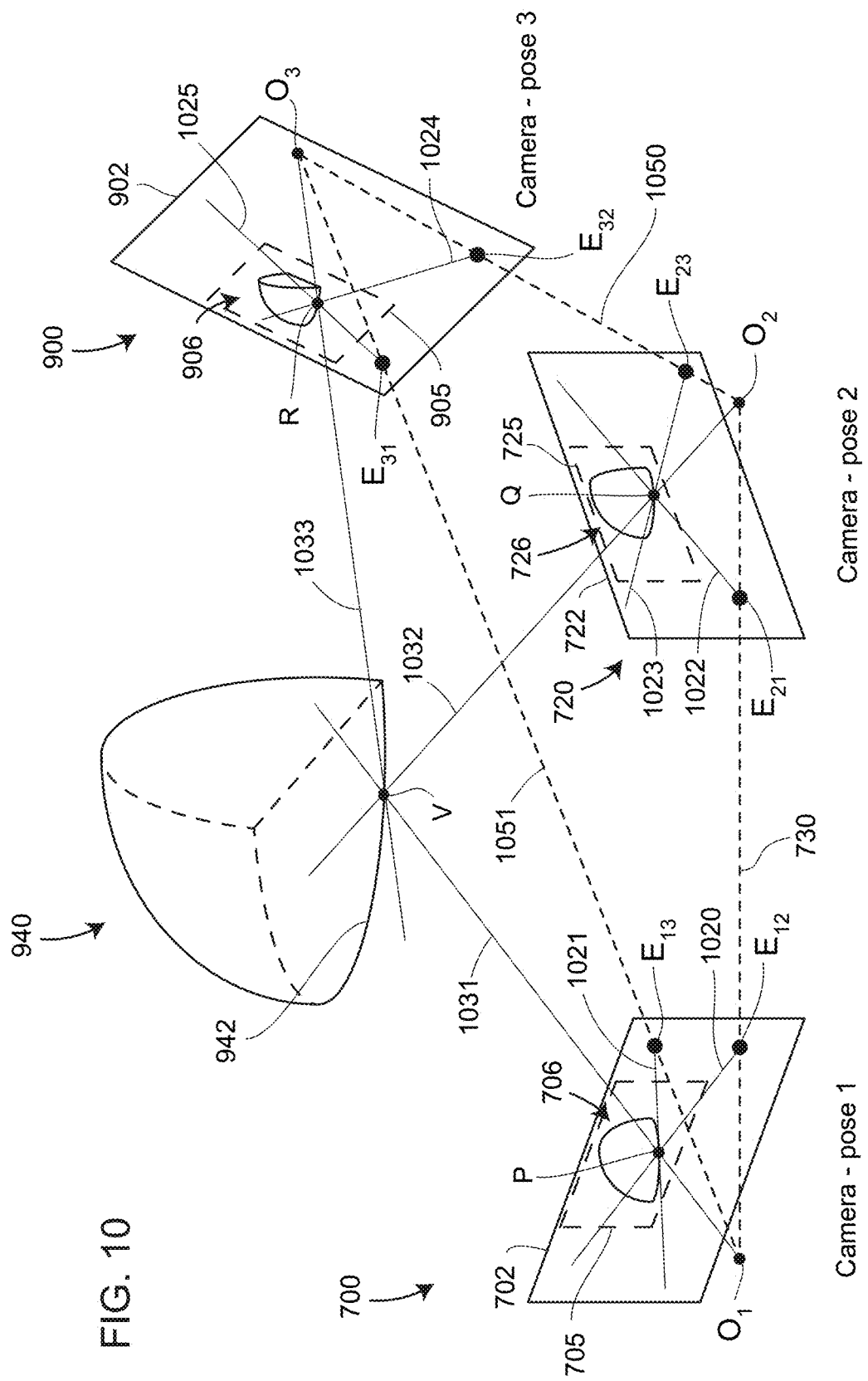
FIG. 10 is a schematic illustration showing finding of 3D coordinates of an object point on a continuous line using epipolar geometry of images of cameras in three different poses according to an embodiment of the present invention.

In an embodiment illustrated in FIG. 10, a 3D object 940 includes a point V on an edge 942 of the object. The method described herein below works even to find the 3D coordinates of a point V in a region for which the edge points are smoothly and continuously varying. As used herein, the expression "smoothly and continuously varying" means that there are no discontinuities in the 3D edge coordinates or in the slope of the 3D edge coordinates. In general, such a point is not an interest point—that is, a point that, when viewed in multiple camera images obtained from different camera poses, is recognized as being same point in 3D space. The point V is projected as a line 1031 to the perspective center $O_1$ of the camera in the first pose 700, intersecting the epipolar plane 702 at the point P. The point V is projected as a line 1032 to the perspective center $O_2$ of the camera in the second pose 720, intersecting the epipolar plane 722 at the point Q. The point V is projected as a line 1033 to the perspective center $O_3$ of the camera in the third pose 900, intersecting the epipolar plane 902 at the point R.

The epipoles of the three epipolar planes are the points of intersection of the epipolar planes with the lines connecting the perspective centers of the cameras in the three poses. The epipolar plane 702 includes two epipoles. The epipole $E_{12}$ is the point at which the epipolar plane 702 is intersected by the line 730 that connects the perspective centers $O_1$ and $O_2$. Likewise, the epipole $E_{13}$ is the point at which the epipolar plane 702 is intersected by the line 1051 that connects the perspective centers $O_1$ and $O_3$. The epipoles $E_{21}$, $E_{23}$ are the points at which the epipolar plane 722 is intersected by the lines 730, 1050, respectively. The epipoles $E_{31}$, $E_{32}$ are the points at which the epipolar plane 902 is intersected by the lines 1051, 1050, respectively.

The epipolar lines are lines that pass through the epipoles and through a point of interest on the epipolar plane. Because the points $E_{12}$, $E_{21}$, and P lie on a common plane, the epipolar line 1020 drawn from $E_{12}$ to the point P can immediately be used to draw the corresponding epipolar line 1022 on the epipolar plane 722. Any one epipolar line can be used to generate a corresponding epipolar line on an adjacent epipolar plane.

Consider the embodiment illustrated in FIG. 10 in which an edge point P is selected on the image 706. An epipolar line 1020 is found that passes through the point P and the epipole $E_{12}$. As explained herein above, the epipolar line 1022 that corresponds to the epipolar line 1020 can immediately be drawn. If the points P and Q faithfully represent the point V, for example, without excessive noise, then the epipolar line 1022 passes through the point Q on the epipolar plane 722. However, as explained herein above with respect to FIG. 7B, without further information, it is not known where the point Q lies on the epipolar line 1022. Without this information, it may not be possible to perform a triangulation calculation to determine the 3D coordinates of the point V. This problem can be overcome by further adding the epipole $E_{23}$ to the epipolar plane 722. The intersection of the epipolar lines 1022, 1023 on the epipolar plane 722 locates the position of the point Q on the epipolar plane 722 and enables determination of the 3D coordinates of the point V. In like manner, the point R can be identified as the intersection of the epipolar lines 1024, 1025. The point P is crossed by the epipolar line 1021 as well as the epipolar line 1020.

FIG. 11 illustrates a method for obtaining 3D coordinates of edge lines on an object such as the automobile 1100. The resulting 3D coordinates of the imaged edge lines are accurately scaled for distance. In an embodiment, a tracker 10 starts at a location C. As in the discussion above, the tracker 10 at this location C is referred to as the tracker 10C. In an embodiment, the tracker is arranged on a motorized tripod assembly 11C that includes a tripod 1112 mounted on a motorized dolly 1120. In an embodiment, each of the three dolly legs 1124 are attached on one end to a wheel, at least two of which are motorized and turned independently by motors. In an embodiment, electrical wires attached to the motor assemblies connect the wheels to a control and power unit 1130. In an embodiment, the control and power unit 1130 includes a rechargeable battery and an electrical circuit board having a processor, a motor controller, and a wireless transceiver, such as that compliant with IEEE 802.11 (Wi-Fi) for example. In an embodiment, the motor assemblies include rotary encoders that measure the rotation of the wheels and send encoder signals to the motor controller within the control and power unit 1130. Rotary encoder signals indicate the angle of rotation of the wheels, from which speed and distance of travel may be calculated by the processor in the control and power unit 1130.

In another embodiment, the tracker 10 is placed on an instrument stand such as the stand 1140. Such an instrument stand may be pushed on wheels or lowered onto three contact areas to ensure stability of the tracker 10 during measurement. In another embodiment, the tracker 10 is mounted on a relatively heavy duty tripod capable of rolling on wheels or resting on stable tripod support feet. In other words, the tracker 10 may be moved under automated control or pushed by an operator.

At the location C in FIG. 11, in an embodiment, the tracker 10 measures at least three central reflection points such as the points 96A, 96B, 96C. At the location C, the tracker 10 may optionally measure additional central reflection points such as the points 96D, 96E, 96F, 96G, 96H. The at least three central reflection points 96A, 96B, 96C need to be visible to and measurable by the tracker 10 in each of the three locations C, D, E. As explained herein above, the central reflection points may be obtained from any type of retroreflector, for example, a cube-corner retroreflector or a cateye retroreflector. The retroreflector may be included in a spherical shell and placed on a kinematic nest to simplify aligning the retroreflector for measurement by the tracker 10. In other embodiments, the retroreflector is not rotatable but is fixed in position using other means such as hot glue. The retroreflector may be placed on an instrument stand such as the stand 1140, on a tripod, on the floor, on a wall or at any other position seen by the tracker 10 at the positions C, D, E.

After the three central reflection points 96A, 96B, 96C have been measured at the location C, the tracker 10 captures a 2D camera image of a first region 1152 within a larger area 1150 of an object 1100. The camera of the tracker 10 may capture additional 2D images within the area 1150. The tracker camera used to capture the 2D images may be any camera coupled to the camera, either externally or internally. In an embodiment, the tracker camera is selected from the group consisting of any of the cameras 76, 78, 5, 470. In an embodiment, more than one camera is used to obtain images of the first region 1152.

In an embodiment, the tracker 10 at location C is moved to the location D and the process repeated. The tracker 10D measures the central reflection points 96A, 96B, 96C and captures a 2D image of the first region 1152. In an embodiment, the tracker 10 is further moved to the location E, where it measures the central reflection points 96A, 96B, 96C and captures another 2D image of the first region 1152.

A computing system 500 (FIG. 5), also referred to as a processor or processor system 500, uses the 3D coordinates of the central reflection points 96A, 96B, 96D as measured by the tracker at the locations C, D, E to obtain the relative pose of the tracker 10 at the locations C, D, E. The processor 500 further identifies edge lines in each of the 2D images of the first region obtained by the tracker camera at the locations C, D, E using edge finding methods such as those described herein above. The processor 500 uses all this information to determine 3D coordinates of points along the edge lines identified in the 2D images of the first region 1152. The determined 3D coordinates may be selected at any point along the imaged edge lines, and an arbitrarily large number of such points may be selected for large areas of the object surface. The determined 3D coordinates are all correctly scaled in three dimensions. In an embodiment, the tracker 10 continues to additional location around the tracker, at each location measuring central reflection points and capturing 2D images. In this way, 3D coordinates of edge lines may be determined. Although the embodiment described above in reference to FIG. 11 was for a single tracker 10 moved to three locations C, D, E, the method works equally well if a different tracker is placed on each of the three different stands 11C, 11D, 11E.

As explained herein above, an another approach to moving a tracker to three or more locations is to leave the tracker fixed and move the object to three or more locations. As illustrated in FIGS. 12A, 12B, 12C, an object 1100 is placed on a conveyor belt 1200 and moved in a direction 1202. In an embodiment, a tracker 10R is placed on the right and another tracker 10L is placed on the left. At a first location of the object 1100 on the conveyor belt 1200, the conveyor belt is brought to a stop while the tracker 10R measures 3D coordinates of central reflection points 96A, 96B, 96C of retroreflectors 95A, 95B, 95C, respectively. At this first location, the tracker 10R is in a first frame of reference relative to the object 1100. The tracker 10R also captures a first image of a first region 1152 with a camera coupled to the tracker 10R. In an embodiment, the camera is one of the cameras 76, 78, 5, 470. At a second location of the object 1100 on the conveyor belt 1200, the conveyor belt 1200 is brought to a stop while the tracker 10R measures 3D coordinates of central reflection points 96A, 96B, 96C of retroreflectors 95A, 95B, 95C, respectively. At this second location, the tracker 10R is in a second frame of reference relative to the object 1100. The tracker 10R also captures a second image of the first region 1152 with the camera coupled to the tracker 10R. At a third location of the object 1100 on the conveyor belt 1200, the conveyor belt 1200 is brought to a stop while the tracker 10R measures 3D coordinates of central reflection points 96A, 96B, 96C of retroreflectors 95A, 95B, 95C, respectively. The tracker 10R also captures a third image of the first region 1152 with the camera. At this third location, the tracker 10R is in a third frame of reference relative to the object 1100. A computing system or processor 500 identifies a first edge line common to each of the first image, the second image, and the third image. The processor 500 selects from one of the first image, the second image, and the third image an arbitrary fourth point on the first edge line. The processor 500 then determines the 3D coordinates of the first edge line using the collected information.

Elements of the method 1300 (FIG. 13) illustrated above are now described. An element 1302 includes fixing in an object frame of reference a first point, a second point, a third point, and an object. In the example of FIGS. 11, 12A, 12B, 12C, the first point is a central reflection point 96A of a retroreflector 95A, the second point is a central reflection point 96B of a retroreflector 95B, the third point is a central reflection point 96C of a retroreflector 95C, and the object is the object 1100.

An element 1304 includes, with the tracker in a first frame of reference relative to the object: measuring with the tracker 3D coordinates of the first point, the second point, and the third point, capturing with a camera coupled to the tracker a first image of a first region of the object. In an embodiment, the tracker is the tracker 10. In an embodiment illustrated in FIG. 11, the tracker 10 is placed at the location C, and is designated as the tracker 10C. In an embodiment illustrated in FIG. 12A, the tracker 10 is the right-side tracker, designated as the tracker 10R. In FIG. 11, the tracker 10C captures a first image of a first region of the object with a camera coupled to the tracker 10C. In FIG. 12A, the tracker 10R captures a first image of a first region of the object with a camera coupled to the tracker 10R. In an embodiment, the first region of the first object is the region 1152. In an embodiment, the camera is one of the cameras 76, 78, 5, 470. The first image captured by the camera is a 2D image.

An element 1306 includes, with the tracker in a second frame of reference relative to the object: measuring with the tracker 3D coordinates of the first point, the second point, and the third point, capturing with the camera a second image of the first region of the object. In an embodiment illustrated in FIG. 11, the tracker 10 is placed at the location D, and is designated as the tracker 10D. In an embodiment illustrated in FIG. 12B, the tracker 10 is the right-side tracker, designated as the tracker 10R. In FIG. 11, the tracker 10D captures a second image of the first region of the object with its camera. In FIG. 12A, the tracker 10R captures a second image of a first region of the object with its camera. In an embodiment, the first region of the first object is the region 1152.

An element 1308 includes, with the tracker in a third frame of reference relative to the object: measuring with the tracker 3D coordinates of the first point, the second point, and the third point, capturing with the camera a third image of the first region of the object. In an embodiment illustrated in FIG. 11, the tracker 10 is placed at the location E, and is designated as the tracker 10E. In an embodiment illustrated in FIG. 12B, the tracker 10 is the right-side tracker, designated as the tracker 10R. In FIG. 11, the tracker 10D captures a third image of the first region of the object with its camera. In FIG. 12A, the tracker 10R captures a third image of a first region of the object with its camera. In an embodiment, the first region of the first object is the region 1152.

An element 1310 includes identifying a first edge line common to each of the first image, the second image, and the third image. In an embodiment, edge lines in the first image, the second image, and the third image are obtained using an edge finding algorithm such as described in the paper Trujillo-Pino [2013], referenced above.

An element 1312 includes selecting in one of the first image, the second image, and third image, a fourth point on the first edge line. Such a point may be arbitrarily selected. Determining coordinates of the arbitrary fourth point may be, for example, based on methods described in the paper by Trujillo-Pino [2013], referenced above.

An element 1314 includes determining in the object frame of reference 3D coordinates of the fourth point based at least in part on the first image, the second image, the third image, the measured 3D coordinates of the first point, the second point, and the third point in the first tracker frame of reference, the measured 3D coordinates of the first point, the second point, and the third point in second tracker frame of reference, and the measured 3D coordinates of the first point, the second point, and third point in the third tracker frame of reference. The mathematical process of transforming measurements made by the tracker in the first, second, and third tracker frame of reference into the object frame of reference was described in reference to FIGS. 6A, 6B. The mathematical process of determining correspondence among points on edge lines captured in 2D camera images was described in reference to FIGS. 7ature8A, 7B, 8, 9 10.

The result of the method 1300 is obtaining of properly scaled 3D coordinates based on 2D images captured by a camera coupled to the tracker. A tracker is thus enabled to rapidly obtain 3D coordinates of an object. In an embodiment, such 3D coordinates are attached to one or more of the 2D images. In another embodiment, a 3D image is reconstructed based on the determined 3D images. In other embodiments, such object surfaces may be reconstructed using a multiplicity of 2D camera images, and may be further enhanced by color or other texturing effects. In an embodiment, surface reconstruction based on camera information collected in a multiplicity of camera images is carried out according to methods described in "A comparison of semiglobal and local dense matching algorithms for surface reconstruction" in International Archives of the Photogrammetry, Remote Sensing and Spatial Information Sciences, Fol. XL-5, 2014, by E. Dall'Asta and R. Roncella, which is incorporated by reference herein. In an embodiment, reconstruction within the determined 3D coordinates of edge lines is carried out according to methods described in "Dense image matching: comparisons and analyses" in Digital Heritage International Congress, 2013, by Remondino, Spera, Nocerino, Menna, Nex, and Barsanti, which is incorporated by reference herein.

Figure 13:
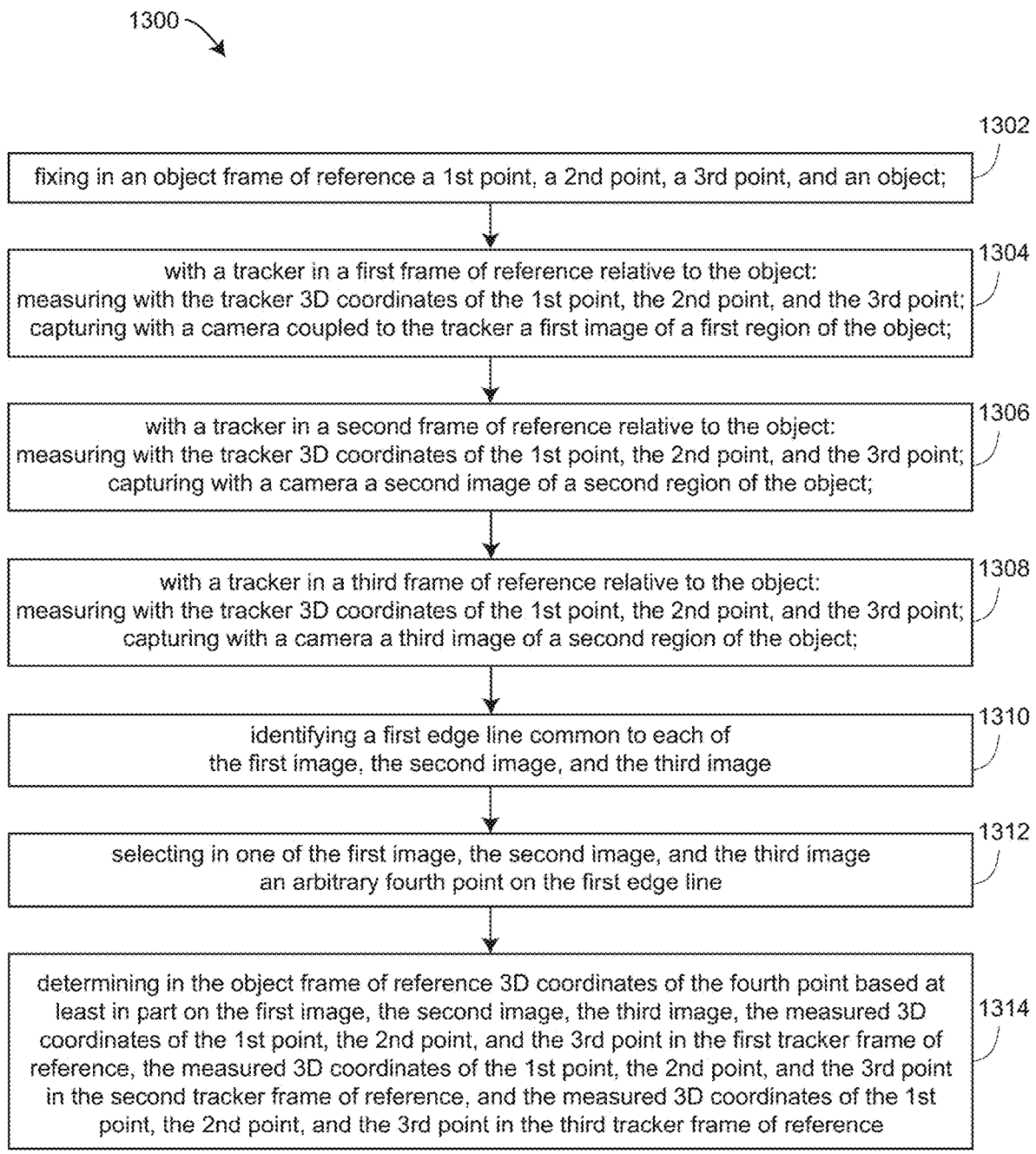
FIG. 13 is a flow chart showing elements of a method for obtaining 3D coordinates of continuous edge lines obtained in camera images according to an embodiment of the present invention.

In an embodiment, such 3D coordinates determined based on the method 1300 of FIG. 13 are further to identify object features. In an embodiment, such features are used direct an operator to perform a measurement, for example, by directing a beam of light onto regions to be measured. In an embodiment, the determined 3D coordinates of the edge lines provides the basis for attaching additional graphical elements to the 2D or 3D representation, thereby obtaining an augmented reality visual representation for an operator.

Technical effects and benefits of some embodiments include the determination of three-dimensional coordinates of points on an object based on images and three-dimensional coordinates of the object measured from different locations in a different frame of reference.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method comprising:
   fixing in an object frame of reference a first point, a second point, a third point, and an object;
   with a tracker in a first frame of reference relative to the object:
      measuring with the tracker three-dimensional (3D) coordinates of the first point, the second point, and the third point; and
      capturing with a camera coupled to the tracker a first image of a first region of the object;
   with the tracker in a second frame of reference relative to the object:
      measuring with the tracker 3D coordinates of the first point, the second point, and the third point; and
      capturing with the camera a second image of the first region of the object;
   with the tracker in a third frame of reference relative to the object:
      measuring with the tracker 3D coordinates of the first point, the second point, and the third point; and
      capturing with the camera a third image of the first region of the object;
   identifying a first edge line common to each of the first image, the second image, and the third image;
   selecting in one of the first image, the second image, and the third image an arbitrary fourth point on the first edge line;
   determining in the object frame of reference 3D coordinates of the fourth point based at least in part on the first image, the second image, the third image, the measured 3D coordinates of the first point, the second point, and the third point in the first frame of reference, the measured 3D coordinates of the first point, the second point, and the third point in the second frame of reference, and the measured 3D coordinates of the first point, the second point, and the third point in the third frame of reference; and
   storing the 3D coordinates of the fourth point.

2. The method of claim 1 further wherein the first point, the second point, and the third point are points of a first retroreflector, a second retroreflector, and a third retroreflector, respectively.

3. The method of claim 1 wherein the object is fixed in space while the tracker moves relative to the object from the first frame of reference to the second frame of reference and from the second frame of reference to the third frame of reference.

4. The method of claim 1 wherein the tracker is fixed in space and the object moves relative to the tracker.

5. The method of claim 1 further comprising: determining in the object frame of reference a multiplicity of 3D coordinates of points on the first edge line based at least in part on the first image, the second image, the third image, the measured 3D coordinates of the first point, the second point, and the third point in the first frame of reference, the measured 3D coordinates of the first point, the second point, and the third point in the second frame of reference, and the measured 3D coordinates of the first point, the second point, and the third point in the third frame of reference.

6. The method of claim 5 further comprising: reconstructing 3D surface coordinates of the object based on the determined multiplicity of 3D coordinates of points on the first edge line and on a multiplicity of camera image points collected off the first edge line.

7. The method of claim 6 further comprising: adding color to the reconstructed 3D surface coordinates.

8. The method of claim 5 further comprising: attaching graphical elements to a visual representation of the object, the visual representation including the determined multiplicity of 3D coordinates of points on the first edge line.

9. A system comprising:
   a tracker operable to measure three-dimensional (3D) coordinates of a retroreflector and to capture two-dimensional (2D) camera images with a camera coupled to the tracker;
   an object, a first retroreflector having a first point, a second retroreflector having a second point, and a third retroreflector having a third point, each of the object, the first point, the second point, and the third point being in an object frame of reference; and
   a processor operable to execute nontransitory computer instructions that, when executed on the processor perform a method comprising:
   causing the tracker, in a first frame of reference relative to the object, to measure 3D coordinates of the first point, the second point, and the third point;
   causing the camera, in the first frame of reference, to capture a first image of a first region of the object;
   causing the tracker, in a second frame of reference relative to the object, to measure 3D coordinates of the first point, the second point, and the third point;
   causing the camera, in the second frame of reference, to capture a second image of the first region of the object;
   causing the tracker, in a third frame of reference relative to the object, to measure 3D coordinates of the first point, the second point, and the third point;
   causing the camera, in the third frame of reference, to capture a third image of the first region of the object;
   identifying a first edge line common to each of the first image, the second image, and the third image;
   selecting in one of the first image, the second image, and the third image an arbitrary fourth point on the first edge line; and
   determining in the object frame of reference 3D coordinates of the fourth point based at least in part on the first image, the second image, the third image, the measured 3D coordinates of the first point, the second point, and the third point in the first frame of reference, the measured 3D coordinates of the first point, the second point, and the third point in the second frame of reference, and the measured 3D coordinates of the first point, the second point, and the third point in the third frame of reference.

10. The system of claim 9 wherein the object is fixed in space while the tracker moves relative to the object.

11. The system of claim 9 wherein the tracker is fixed in space and the object moves relative to the tracker.

12. The system of claim 9 wherein the processor is further operable to execute nontransitory computer instructions that, when executed on the processor, determines in the object frame of reference a multiplicity of 3D coordinates of points on the first edge line based at least in part on the first image, the second image, the third image, the measured 3D coordinates of the first point, the second point, and the third point in the first frame of reference, the measured 3D coordinates of the first point, the second point, and the third point in the second frame of reference, and the measured 3D coordinates of the first point, the second point, and the third point in the third frame of reference.

13. The system of claim 12 wherein the processor is further operable to execute nontransitory computer instructions that, when executed on the processor, reconstructs 3D surface coordinates of the object based on the determined multiplicity of 3D coordinates of points on the first edge line and on a multiplicity of camera image points collected off the first edge line.

14. The system of claim 13 wherein the processor is further operable to execute nontransitory computer instructions that, when executed on the processor, adds color to the reconstructed 3D surface coordinates.

15. The system of claim 12 wherein the processor is further operable to execute nontransitory computer instructions that, when executed on the processor, attaches graphical elements to a visual representation of the object, the visual representation including the determined multiplicity of 3D coordinates of points on the first edge line.

* * * * *